(12) United States Patent
Naito et al.

(10) Patent No.: US 11,542,192 B2
(45) Date of Patent: Jan. 3, 2023

(54) SEALING MATERIAL AND MULTILAYERED GLASS PANEL USING SAME

(71) Applicant: Showa Denko Materials Co., Ltd., Tokyo (JP)

(72) Inventors: Takashi Naito, Tokyo (JP); Shinichi Tachizono, Tokyo (JP); Kei Yoshimura, Tokyo (JP); Yuji Hashiba, Tokyo (JP); Hironori Suzuki, Tokyo (JP); Taigo Onodera, Tokyo (JP); Tatsuya Miyake, Tokyo (JP); Akitoyo Konno, Tokyo (JP)

(73) Assignee: Showa Denko Materials Co., Ltd., Tokyo (JP)

( * ) Notice: Subject to any disclaimer, the term of this patent is extended or adjusted under 35 U.S.C. 154(b) by 0 days.

(21) Appl. No.: 16/767,473

(22) PCT Filed: Nov. 1, 2018

(86) PCT No.: PCT/JP2018/040710
§ 371 (c)(1),
(2) Date: May 27, 2020

(87) PCT Pub. No.: WO2019/107063
PCT Pub. Date: Jun. 6, 2019

(65) Prior Publication Data
US 2020/0392036 A1    Dec. 17, 2020

(30) Foreign Application Priority Data
Nov. 28, 2017 (JP) .............................. JP2017-227511

(51) Int. Cl.
*C03C 8/24* (2006.01)
*B32B 17/10* (2006.01)
(Continued)

(52) U.S. Cl.
CPC .......... *C03C 8/24* (2013.01); *B32B 17/10036* (2013.01); *B32B 17/10137* (2013.01);
(Continued)

(58) Field of Classification Search
CPC ..... C03C 8/24; C03C 8/08; C03C 2201/3411; C03C 2201/3417; C03C 27/06;
(Continued)

(56) References Cited

U.S. PATENT DOCUMENTS

2016/0229737 A1\* 8/2016 Naito ........................ C03C 8/02
2017/0321471 A1\* 11/2017 Abe .......................... E06B 3/66

FOREIGN PATENT DOCUMENTS

JP    2007-320822 A    12/2007
JP    2013-32255 A    2/2013
(Continued)

Primary Examiner — Zachary M Davis
(74) Attorney, Agent, or Firm — Crowell & Moring LLP

(57) ABSTRACT

The present invention provides a highly reliable multilayered glass panel and an encapsulating material for achieving the highly reliable multilayered glass panel. The encapsulating material includes lead-free low melting glass particles containing vanadium oxide and tellurium oxide, low thermal expansion filler particles, and glass beads as a solid content. A volume fraction of the glass beads in the solid content is not less than 10% to not more than 35%, and a volume fraction of the lead-free low melting glass particles in the solid content is larger than a volume fraction of the low thermal expansion filler in the solid content.

17 Claims, 15 Drawing Sheets

(51) Int. Cl.
*C03C 8/08* (2006.01)
*C03C 27/06* (2006.01)
*E06B 3/66* (2006.01)
*E06B 3/663* (2006.01)
*E06B 3/673* (2006.01)
*E06B 3/677* (2006.01)

(52) U.S. Cl.
CPC .......... *B32B 17/10614* (2013.01); *C03C 8/08* (2013.01); *C03C 27/06* (2013.01); *E06B 3/6612* (2013.01); *E06B 3/66304* (2013.01); *E06B 3/66333* (2013.01); *E06B 3/6733* (2013.01); *E06B 3/6736* (2013.01); *E06B 3/6775* (2013.01); *E06B 2003/66338* (2013.01)

(58) Field of Classification Search
CPC .... C03C 8/00; C03C 8/02; C03C 8/14; E06B 3/66304; E06B 3/6736; E06B 3/6733; E06B 3/6775; E06B 3/66333; E06B 2003/66338; Y02B 80/22; Y02A 30/249; B32B 17/10137; B32B 17/10614; B32B 17/10036; B32B 17/10064; B32B 17/10073
See application file for complete search history.

(56) References Cited

FOREIGN PATENT DOCUMENTS

| | | |
|---|---|---|
| WO | WO 2016/092849 A1 | 6/2016 |
| WO | WO 2017/126378 A1 | 7/2017 |

* cited by examiner

SEALING MATERIAL AND MULTILAYERED GLASS PANEL USING SAME

TECHNICAL FIELD

The present invention relates to an encapsulating material and a multilayered glass panel using the encapsulating material.

BACKGROUND ART

In recent years, window glass with much higher thermal insulation than conventional multilayered glass windows has been required. In order to achieve this, high thermal insulation by high vacuum in the interior of a multilayered glass window is essential. In order to spread it worldwide, it is necessary to advance development with due consideration for manufacturing costs, etc. of a multilayered glass window.

When trying to achieve high vacuum in the interior of a multilayered glass window panel, it is necessary to increase the number of spacers to secure a space inside the panel. A cylindrical metal is generally used for the spacers. Since metal has high thermal conductivity, however, a possible arising inconsistent problem is that if the number of spacers is increased, thermal insulation will be reduced even if the degree of vacuum is increased.

It is conceivable to use ceramics or glass having lower thermal conductivity than metal for spacers. Ceramics or glass, however, is a material harder than metal. Panel glass therefore may be damaged and a vacuum insulated multilayered glass panel may be destroyed.

Resin has low thermal conductivity and hence is effectively applied to spacers instead of metal, ceramics, and glass. On the other hand, since resin has a lower thermal resistance than metal, ceramics, and glass, however, it is necessary to apply hermetic sealing at a low temperature lower than a heatproof temperature. When resin is used for spacers therefore, it is difficult to apply a conventional lead-based low melting glass or bismuth-based low melting glass having a high sealing temperature.

Further, for prevention of damage due to high vacuum, safety, crime prevention, etc., application of a tempered glass that hardly breaks by applying an air-cool tempering treatment or the like to a panel glass is required. The tempered glass achieves high strength by forming a compression strengthened layer over the surface. However, a strengthened layer of the conventional lead-based low melting glass or bismuth-based low melting glass reduces gradually at a heating temperature of about 320° C. or higher and disappears at about 400° C. or higher. With the conventional lead-based low melting glass or bismuth-based low melting glass having a sealing temperature of 400° C. or higher, therefore, it is difficult to apply the tempered glass to the panel glass.

As stated above, in order to achieve high vacuum in the interior of a panel and high thermal insulation of the panel in a vacuum insulated multilayered glass panel, it is very important to lower a sealing temperature.

PTL 1 discloses a lead-free low melting glass composition including $Ag_2O$ of 10% to 60% by mass, $V_2O_3$ of 5% to 65% by mass, and $TeO_2$ of 15% to 50% by mass when the components are represented by oxides, in which: a total content of $Ag_2O$, $V_2O_3$, and $TeO_2$ is not less than 75% by mass to less than 100% by mass; and the balance includes at least one kind of $P_2O_3$, BaO, $K_2O$, $WO_3$, $Fe_2O_3$, $MnO_2$, $Sb_2O_3$, and ZnO of more than 0% by mass to not more than 25% by mass. The $Ag_2O$—$V_2O_5$—$TeO_2$-based lead-free low melting glass has a softening point in the temperature range of 268° C. to 320° C., and softens and fluidizes at a much lower temperature than a conventional lead-based or bismuth-based low melting glass.

PTL 2 discloses a glass sealing material including vanadium-based ($V_2O_5$—$P_2O_5$-based) low melting glass (vanadium phosphate glass) and filler particles, the low melting glass being applicable as a sealing material of a glass panel for a flat panel display, not devitrifying during a sealing process, and being able to obtain a high bond strength. The glass sealing material further includes glass beads of 0.1% to 1.0% by volume. Here, the glass beads function as an aggregate for attaching two panel glasses at equal intervals.

CITATION LIST

Patent Literature

PTL 1: Japanese Patent Application Laid-Open No. 2013-32255

PTL 2: Japanese Patent Application Laid-Open No. 2007-320822

SUMMARY OF INVENTION

Technical Problem

The glass composition disclosed in PTL 1 enables hermetic sealing at a low temperature of 320° C. or lower. The mechanical strength of a seal part, however, tends to deteriorate as a sealing temperature lowers. There is room, therefore, for improvement in the reliability of the seal part.

The vanadium phosphate glass disclosed in PTL 2 has a softening point of around 400° C. and a fluidizing point of about 450° C. to 500° C., and hence the improvement of the mechanical strength of a seal part with lowering of a sealing temperature has not been sufficiently studied.

An object of the present invention is to provide a highly reliable multilayered glass panel and an encapsulating material for achieving the highly reliable multilayered glass panel.

Solution to Problem

An encapsulating material according to the present invention includes lead-free low melting glass particles containing vanadium oxide and tellurium oxide, low thermal expansion filler particles, and glass beads as a solid content, in which a volume fraction of the glass beads in the solid content is not less than 10% to not more than 35%; and a volume fraction of the lead-free low melting glass particles in the solid content is larger than a volume fraction of the low thermal expansion filler in the solid content.

Advantageous Effects of Invention

The present invention makes it possible to provide a highly reliable multilayered glass panel and an encapsulating material for achieving the highly reliable multilayered glass panel.

DESCRIPTION OF EMBODIMENTS

Embodiments according to the present invention are explained hereunder in reference to the drawings. The present invention, however, is not limited to the embodiments featured here and can be combined or improved appropriately in the range not changing the tenor of the present invention.

(Vacuum Insulated Multilayered Glass Panel)

A vacuum insulated multilayered glass panel (merely referred to also as "multilayered glass panel") applied to window glass for a building material or the like has an interior space between two glass substrates with many spacers interposed. The interior space is in a vacuum state and further the periphery of the two glass substrates is sealed hermetically in order to retain the vacuum state for a long period of time. An encapsulating material including a low melting glass and low thermal expansion filler particles is applied to the hermetic sealing of the periphery, and the hermetically sealed part is in the state of dispersing the low thermal expansion filler in the low melting glass. Further, a distance between the two glass substrates, namely a height of the spacers and a thickness of the hermetically sealed part, is usually in the range of 100 to 300 μm in the vacuum insulated multilayered glass panel.

Figure 1A:
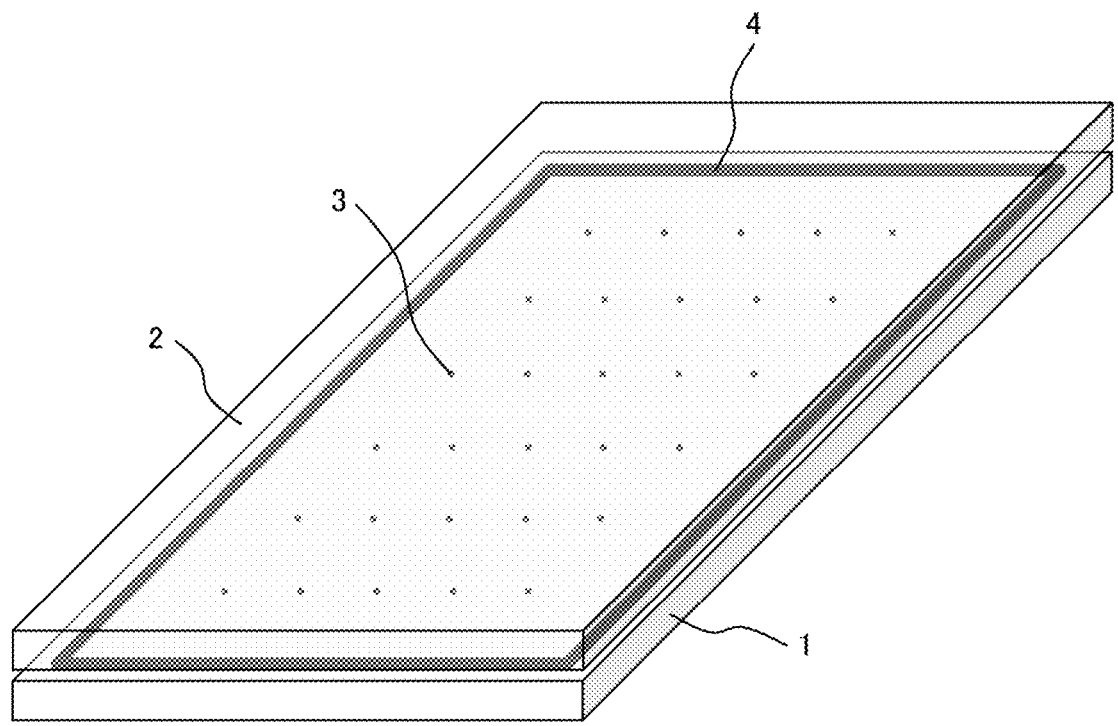
FIG. 1A is a schematic perspective view showing a typical vacuum insulated multilayered glass panel.

FIG. 1A is a schematic perspective view showing a typical vacuum insulated multilayered glass panel.

Figure 1B:
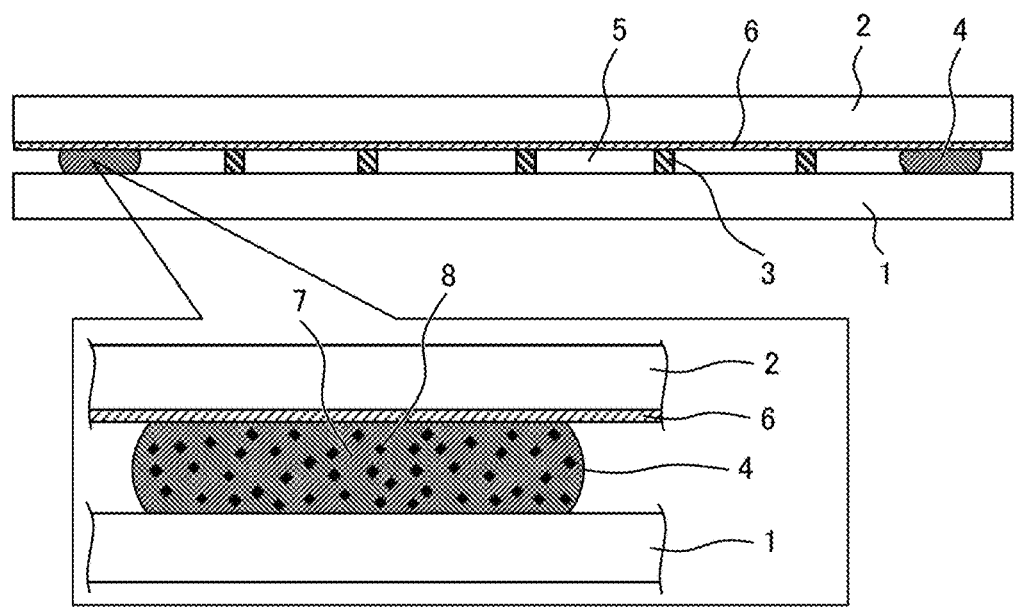
FIG. 1B is a sectional view of the vacuum insulated multilayered glass panel in FIG. 1A and an enlarged sectional view showing a seal part.

FIG. 1B is a sectional view corresponding to FIGS. 1A and 1s a view enlarging and showing a hermetical seal part.

In FIG. 1A, a vacuum insulated multilayered glass panel has a first glass substrate 1, and a second glass substrate 2 as well as spacers 3 and a seal part 4 which are interposed between the substrates. The seal part 4 is formed at a periphery of the first glass substrate 1 and the second glass substrate 2.

Further, as shown in FIG. 1B, the interior space 5 is formed in the region surrounded by the first glass substrate 1, the second glass substrate 2, and the seal part 4. A heat ray reflecting film 6 is attached over the inner surface of the second glass substrate 2. Multiple spacers 3 are placed and support the first glass substrate 1 and the second glass substrate 2 so that a distance between the first glass substrate 1 and the second glass substrate 2 may be a predetermined value. Generally it is desirable that the distance is constant.

In the vacuum insulated multilayered glass panel, a soda lime glass substrate having a thermal expansion coefficient in the range of 80 to 90×$10^{-7}$/° C. is generally used for the first glass substrate 1 and the second glass substrate 2.

As shown in the enlarged view of FIG. 1B, the seal part 4 includes low melting glass 7 and low thermal expansion filler particles 8. The low thermal expansion filler particles 8 are dispersed in the low melting glass 7. A vacuum state of the interior space 5 is realized by the seal part 4 and is retained on a long-term basis. The low thermal expansion filler particles 8 are mixed for conforming the thermal expansion coefficient of the seal part 4 to the thermal expansion coefficient of the first glass substrate 1 and the second glass substrate 2.

The heat ray reflecting film 6 is effective when the vacuum insulated multilayered glass panel is applied to window glass for a building material and is used generally.

In such a vacuum insulated multilayered glass panel, a sealing temperature is almost determined by the softening and fluidizing characteristics at a heating temperature of the low melting glass 7 use for the seal part 4. In other words, a sealing temperature can be lowered as the low melting glass 7 of a lower softening point is used. In contrast, however, mechanical strength tends to lower as the low melting glass 7 of a lower softening point is used. Further, on this occasion, a thermal expansion coefficient tends to increase. To cope with this, it is necessary to increase a volume fraction of the low thermal expansion filler particles 8 contained in the seal part 4.

Figure 2:
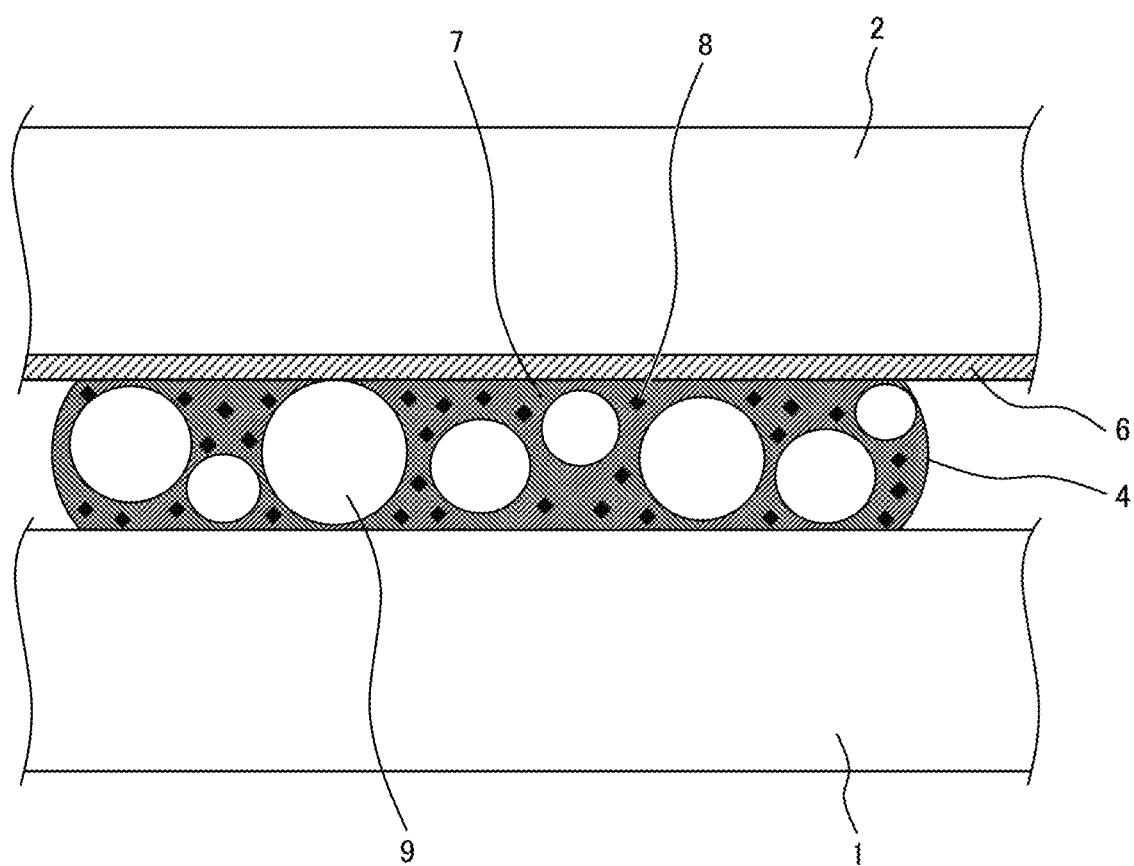
FIG. 2 is an enlarged sectional view showing a seal part of a vacuum insulated multilayered glass panel according to an embodiment.

FIG. 2 is a view enlarging and showing a cross section of a seal part in a typical vacuum insulated multilayered glass panel according to an embodiment.

A different point in FIG. 2 from the enlarged view of FIG. 1B is that spherical glass beads 9 are also dispersed in low melting glass 7.

The low melting glass 7 (lead-free low melting glass) contains vanadium oxide ($V_2O_5$) and tellurium oxide ($TeO_2$). By this composition, a sealing temperature can be lower than 400° C.

A volume fraction of the glass beads 9 is not less than 10% to not more than 35%. A volume fraction of the low melting glass 7 is larger than a volume fraction of the low thermal expansion filler particles 8.

By controlling the volume fraction of the glass beads 9 in the above range, it is possible to prevent cohesive failure at the seal part 4 and improve mechanical strength. As a result, the reliability of a vacuum insulated multilayered glass panel can be secured. If the volume fraction of the glass beads 9 is less than 10%, the improvement of mechanical strength is scarcely seen. In contrast, if the volume fraction of the glass beads 9 exceeds 35%, the seal part 4 is likely to peel off from an interface with the first glass substrate 1 or the second glass substrate 2. Here, the volume fraction of the glass beads 9 is desirably not less than 20% to not more than 30%.

Further, when the low melting glass 7 contains silver oxide ($Ag_2O$), the sealing temperature can be lower than 320° C. As a result, a resin having low thermal conductivity can be applied to the spacers 3. Further, a tempered glass subjected to an air-cool tempering treatment or a chemical tempering treatment can be applied to the first glass substrate 1 and the second glass substrate 2. Further, by lowering the sealing temperature, it is possible to improve mass productivity of a vacuum insulated multilayered glass panel, reduce mass production capital investment, and contribute to the reduction of manufacturing costs.

With regard to the size of glass beads 9, the maximum diameter has to be not more than a distance between the first glass substrate 1 and the second glass substrate 2. Further, an average diameter ($D_{50}$) is desirably not less than half of the distance. Here, the average diameter ($D_{50}$) is a median diameter and is also referred to as "average particle size". An average particle size ($D_{50}$) of the glass beads 9 can be obtained by, for example, classifying the glass beads 9 with a sieve and successively measuring the glass beads 9 by a laser diffraction/scattering particle size distribution analyzer.

It is desirable that the glass beads 9 are the same or similar glass system as the first glass substrate 1 and the second glass substrate 2. This is because the thermal expansion characteristics are the same or close and this makes it possible to stably improve the mechanical strength of the seal part.

Specifically, it is desirable to use glass beads of soda lime glass ($SiO_2$—$Na_2O$—$CaO$-based glass), borosilicate glass ($SiO_2$—$B_2O_3$—$Na_2O$-based glass), quartz glass ($SiO_2$), or the like.

Meanwhile, in the present description, glass beads are defined as nearly spherical glass. Further, in a vacuum insulated multilayered glass panel, low thermal expansion filler particles 8 are mixed in order to conform the thermal expansion of the seal part 4 to the thermal expansion of the first glass substrate 1 and the second glass substrate 2 but, if the volume fraction of the low thermal expansion filler particles 8 is not less than the volume fraction of the low melting glass 7, the softening and fluidizing characteristics of the low melting glass 7 during heating and sealing deteriorate, and hermetic sealing is hardly obtained. The volume fraction of the low melting glass 7, therefore, has to be larger than the volume fraction of the low thermal expansion filler particles 8. More desirably, it is effective to control the volume fraction of the low melting glass 7 to not less than 35%. Further, the volume fraction of the low melting glass 7 is desirably not more than 72%.

When the low melting glass 7 further contains at least one kind of tungsten oxide ($WO_2$), barium oxide (BaO), potassium oxide ($K_2O$), and phosphorous oxide ($P_2O_5$) as a glass component, vitrification can be facilitated during glass production. By such a composition, it is possible to reduce the crystallization tendency of the manufactured low melting glass 7. If the crystallization tendency of the low melting glass 7 is large, arising problems are that crystallization occurs during heating and sealing, good softening and fluidizing characteristics are not obtained, and high airtightness is not obtained at the seal part 4.

It is effective to further contain at least one kind of aluminum oxide ($Al_2O_3$), iron oxide ($Fe_2O_3$), yttrium oxide ($Y_2O_3$), and lanthanum oxide ($La_2O_3$) as a glass component. Those components contribute to the prevention or significant suppression of crystallization even with small quantities. As a result, a highly hermetic seal part 4 is obtained.

As the low thermal expansion filler particles 8, a substance including zirconium phosphate tungstate ($Zr_2(WO_4)(PO_4)_2$), quartz glass, β-eucryptite, or cordierite can be used, for example.

Among those materials, zirconium phosphate tungstate is effective. Zirconium phosphate tungstate has a large negative thermal expansion and the thermal expansion coefficient is $-40 \times 10^{-7}$/° C. Further, since the low thermal expansion filler particles 8 have good wettability and adhesiveness with the low melting glass 7, the effect of low thermal expansion is large and the characteristic of easily conforming the thermal expansion of the seal part 4 to the thermal expansion of a glass substrate can be obtained. It is desirable that the average particle size ($D_{50}$) of the low thermal expansion filler is not less than 3 μm to not more than 20 μm. By controlling the average particle size ($D_{50}$) of the low thermal expansion filler to not less than 3 μm to not more than 20 μm, it is possible to inhibit cracks from occurring at an interface and obtain the effect of thermal expansion coefficient adjustment. Here, the average particle size ($D_{50}$) of the low thermal expansion filler can be measured by a laser diffraction/scattering particle size distribution analyzer.

When lead-free low melting glass containing vanadium oxide ($V_2O_5$), tellurium oxide ($TeO_2$), and silver oxide ($Ag_2O$) is used for a seal part in particular, the sealing temperature can be lowered, and hence a resin of low thermal conductivity can be applied to the spacers 3. Specific examples of resin are polyimide resin, polyamide resin, fluororesin, epoxy resin, phenoxy resin, and silicone resin.

In general, resin is softer than metal, ceramics, and glass, and hence the resin never damages or destroys the first glass substrate 1 and the second glass substrate 2 when resin is used for the spacers 3. Otherwise, when hardness is required as the spacers 3, glass particles or ceramic particles may be dispersed as a filler in a resin.

A vacuum insulated multilayered glass panel according to the present embodiment is excellent in thermal insulation properties, mass productivity, and reliability, and hence is effectively applicable particularly to window glass for a building material. Moreover, a vacuum insulated multilayered glass panel according to the present embodiment is easy to spread widely in housing and construction fields around the world. As a result, it can reduce $CO_2$ emissions by reducing energy consumption and contribute to global warming countermeasures. Further, the vacuum insulated multilayered glass panel can also apply to other than window glass for a building material and can apply widely to a part or a product such as vehicle window glass and a door of a commercial refrigerator or freezer which require thermal insulation properties.

(Encapsulating Material Paste)

The seal part 4 of a vacuum insulated multilayered glass panel shown in FIG. 2 is generally formed by using encapsulating material paste. The encapsulating material paste includes particles of the low melting glass 7 containing vanadium oxide ($V_2O_5$) and tellurium oxide ($TeO_2$), the low thermal expansion filler particles 8, the glass beads 9, a binder resin, and a solvent.

Meanwhile, in this description, explanations are made on the premise that a solid content in the constituent components of such encapsulating material paste is the low melting glass 7, the low thermal expansion filler particles 8, and the glass beads 9. The reason is that the binder resin and the solvent vaporize during drying and baking and are not substantially contained in a completed seal part 4.

Further, a volume fraction in a solid content is calculated by using a sum of true volumes of the three constituent components in the solid content as a reference (denominator). This is because the seal part 4 is thought substantially not to have a void. In the present description, description of "volume fraction" related to "solid content" represents "a volume fraction in a solid content" even in the case of being merely described as "a volume fraction". A volume fraction is a fraction based on a volume and the unit is % by volume. Here, in the present description, % by volume may be represented merely as "%" in some cases.

A volume fraction of the glass beads 9 in the solid content is not less than 10% to not more than 35%. Further, it is desirable that a volume fraction of the particles of the low melting glass 7 in the solid content is larger than a volume fraction of the low thermal expansion filler particles 8 in the solid content.

Further, the size of the glass beads 9 in the solid content is appropriately not less than 50 μm to not more than 200 μm in terms of an average diameter ($D_{50}$) of the glass beads 9 in consideration of a distance between the first glass substrate 1 and the second glass substrate 2 in a vacuum insulated multilayered glass panel, namely a height of the spacers 3 and a thickness of the seal part 4. The reason is that a distance between the first glass substrate 1 and the second glass substrate 2 in a vacuum insulated multilayered glass panel, namely a height of the spacers 3 and a thickness of the seal part 4, is usually in the range of 100 to 300 μm.

It is particularly effective that a volume fraction of the glass beads 9 in the solid content is not less than 20% to not more than 30% from the viewpoint of strength improvement of the seal part 4. Further, it is particularly effective that a volume fraction of the particles of the low melting glass 7 in the solid content is not less than 35%. Furthermore, it is desirable that a volume fraction of the particles of the low melting glass 7 is not more than 72%.

It is desirable that a binder resin contained in encapsulating material paste is at least one kind of ethyl cellulose, nitrocellulose, and aliphatic polycarbonate in consideration of the influence of the softening and fluidizing characteristics, the crystallization, and the like on the low melting glass 7. Further, likewise it is desirable that a solvent is at least one kind of butyl carbitol acetate, a terpene solvent, and propylene carbonate in consideration of influence on the low melting glass 7.

By applying the above encapsulating material paste to the seal part 4 in a vacuum insulated multilayered glass panel, it is possible to lower a sealing temperature and moreover obtain high airtightness and sealing strength. Further, because it is possible to apply resin to the spacers 3 and tempered glass to the first glass substrate 1 and the second glass substrate 2, it is possible to improve the thermal insulation properties, mass productivity, and reliability of the vacuum insulated multilayered glass panel.

(Manufacturing Method of Vacuum Insulated Multilayered Glass Panel)

An exhaust pipe method that is an example of a series of typical manufacturing methods of a vacuum multilayered glass panel is explained in reference to FIGS. 3A to 7B.

Figure 3A:
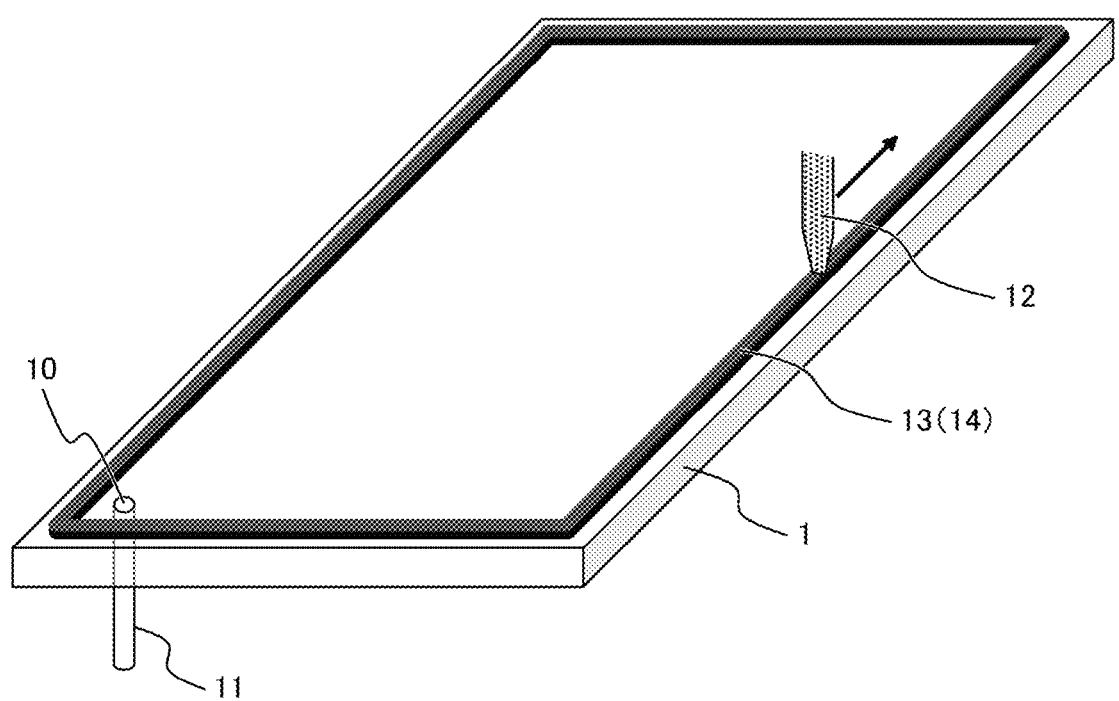
FIG. 3A is a schematic perspective view showing a process of applying encapsulating material paste, which is a part of a manufacturing method of a vacuum insulated multilayered glass panel according to an embodiment.

FIG. 3A is a perspective view showing a process of applying encapsulating material paste.

Figure 3B:
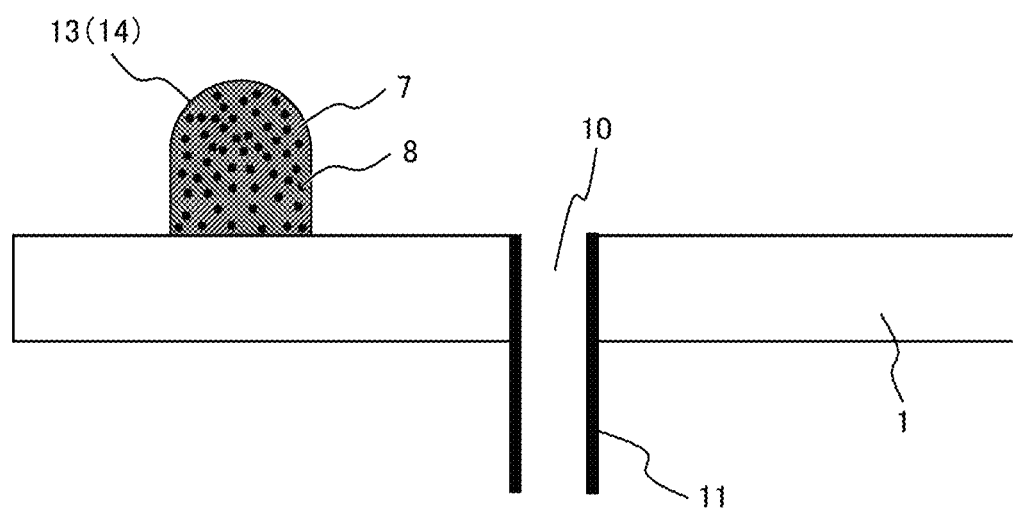
FIG. 3B is an enlarged sectional view showing a periphery of the vacuum insulated multilayered glass panel in FIG. 3A.

FIG. 3B is a partially enlarged sectional view of FIG. 3A.

Figure 4A:
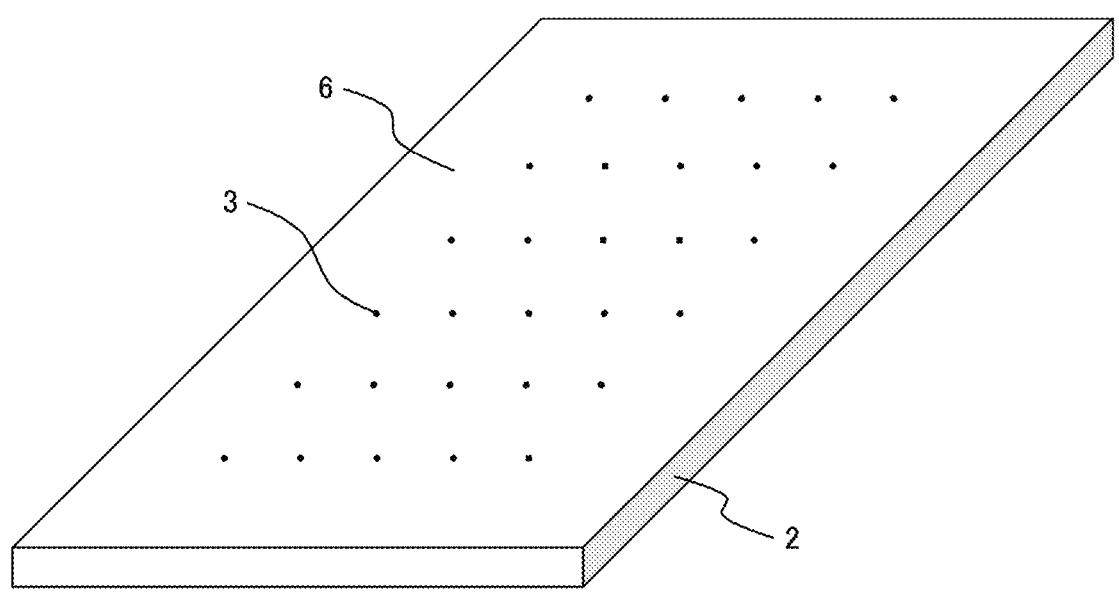
FIG. 4A is a schematic perspective view showing a process of forming a heat ray reflecting film and spacers, which is a part of a manufacturing method of a vacuum insulated multilayered glass panel according to an embodiment.

FIG. 4A is a perspective view showing a state of forming a heat ray reflecting film and spacers.

Figure 4B:
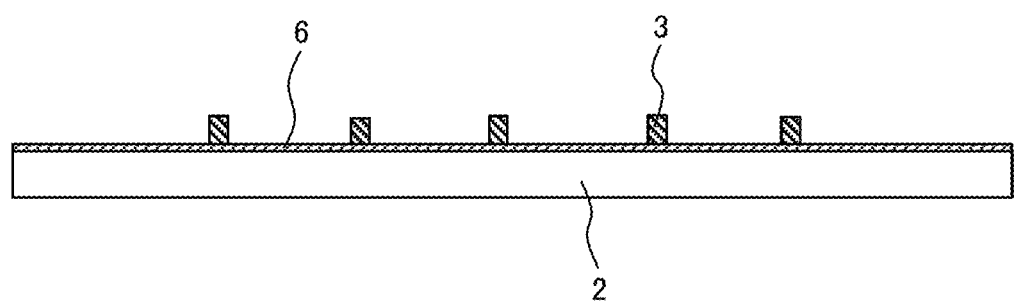
FIG. 4B is a schematic sectional view of FIG. 4A.

FIG. 4B is a sectional view of FIG. 4A.

Figure 5A:
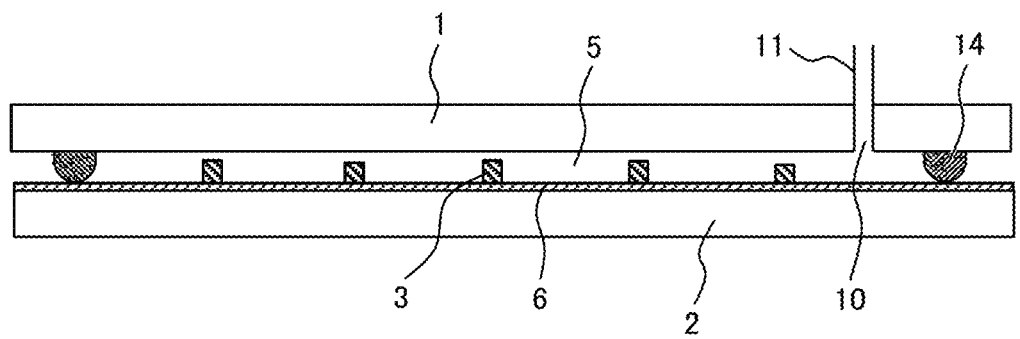
FIG. 5A is a schematic sectional view showing a state of stacking two glass substrates, which is a part of a manufacturing method of a vacuum insulated multilayered glass panel according to an embodiment.

FIG. 5A is a sectional view showing a state of combining two glass substrates.

Figure 5B:
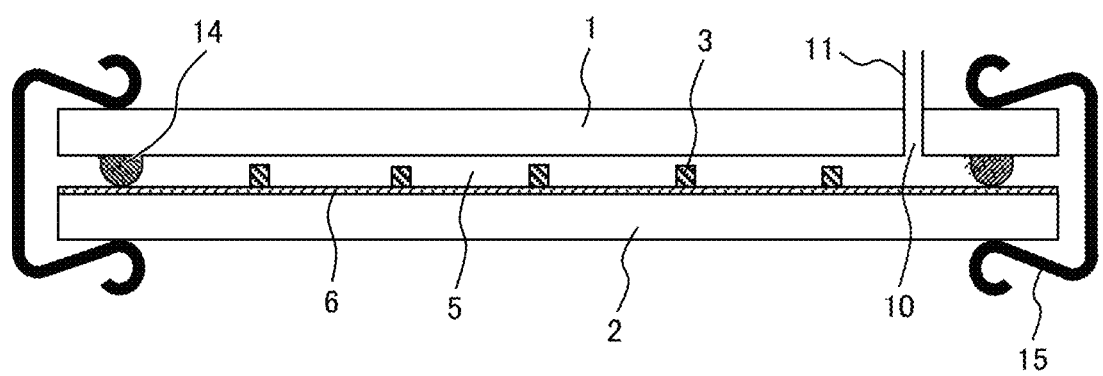
FIG. 5B is a schematic sectional view showing a state of fixing two glass substrates, which is a part of a manufacturing method of a vacuum insulated multilayered glass panel according to an embodiment.

FIG. 5B is a sectional view showing a state of fixing two glass substrates.

Figure 6A:
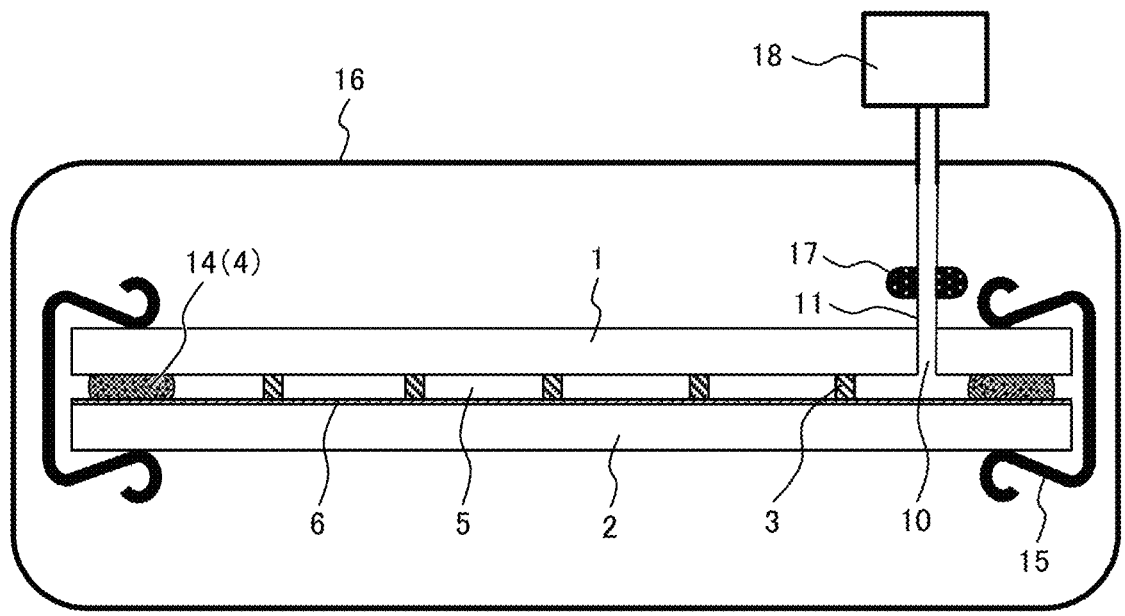
FIG. 6A is a schematic sectional view showing a process of depressurizing an interior space of a vacuum multilayered glass panel, which is a part of a manufacturing method of a vacuum insulated multilayered glass panel according to an embodiment.

FIG. 6A is a sectional view showing a process of depressurizing an interior space of a vacuum multilayered glass panel.

Figure 6B:
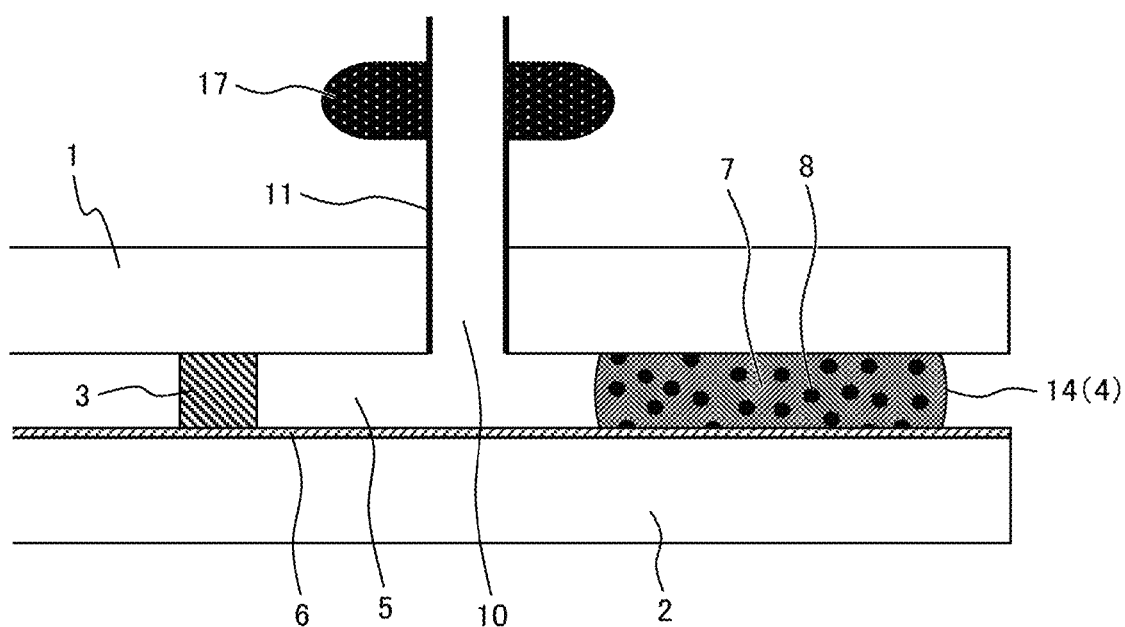
FIG. 6B is a partially enlarged sectional view showing a vicinity of the seal part in FIG. 6A.

FIG. 6B is a partially enlarged sectional view of FIG. 6A.

Figure 7A:
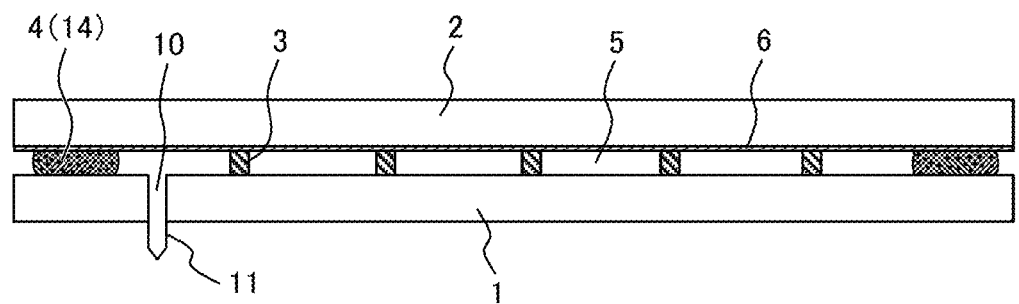
FIG. 7A is a schematic sectional view showing a state of sealing an interior space of a vacuum multilayered glass panel, which is a part of a manufacturing method of a vacuum insulated multilayered glass panel according to an embodiment.

FIG. 7A is a sectional view showing a state of sealing an interior space of a vacuum multilayered glass panel.

Figure 7B:
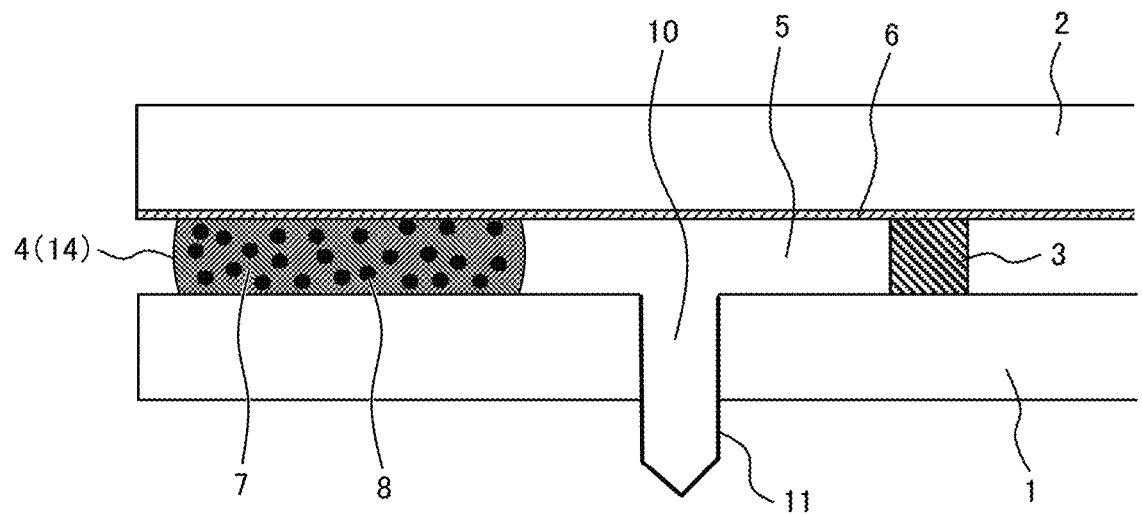
FIG. 7B is a partially enlarged sectional view showing a vicinity of the seal part in FIG. 7A.

FIG. 7B is a partially enlarged sectional view of FIG. 7A.

Figure 8A:
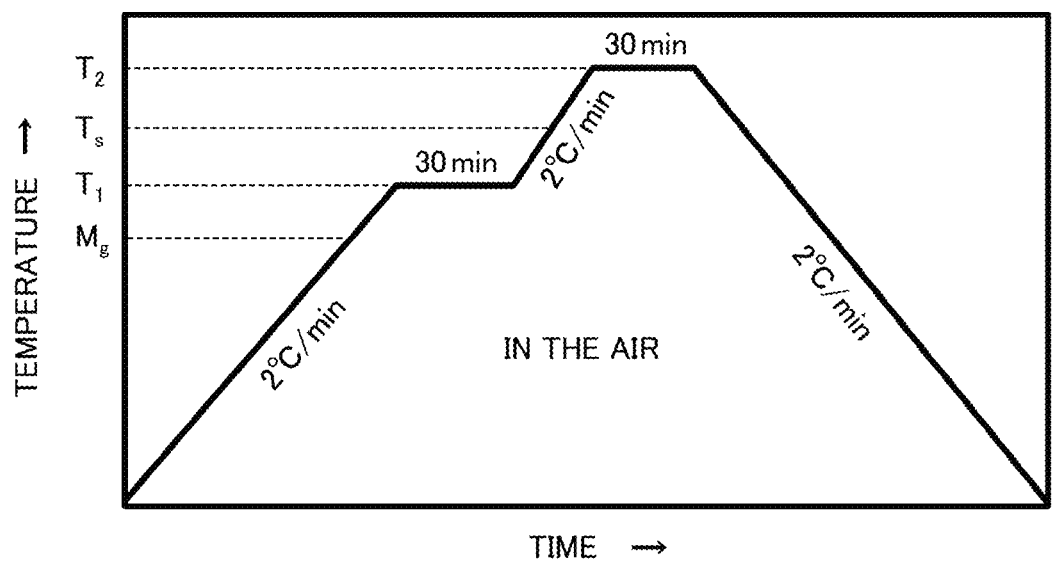
FIG. 8A is a graph showing a temperature profile in a process of removing a binder resin in encapsulating material paste.

FIG. 8A is a graph showing a temperature profile in a process of removing a binder resin in encapsulating material paste.

Figure 8B:
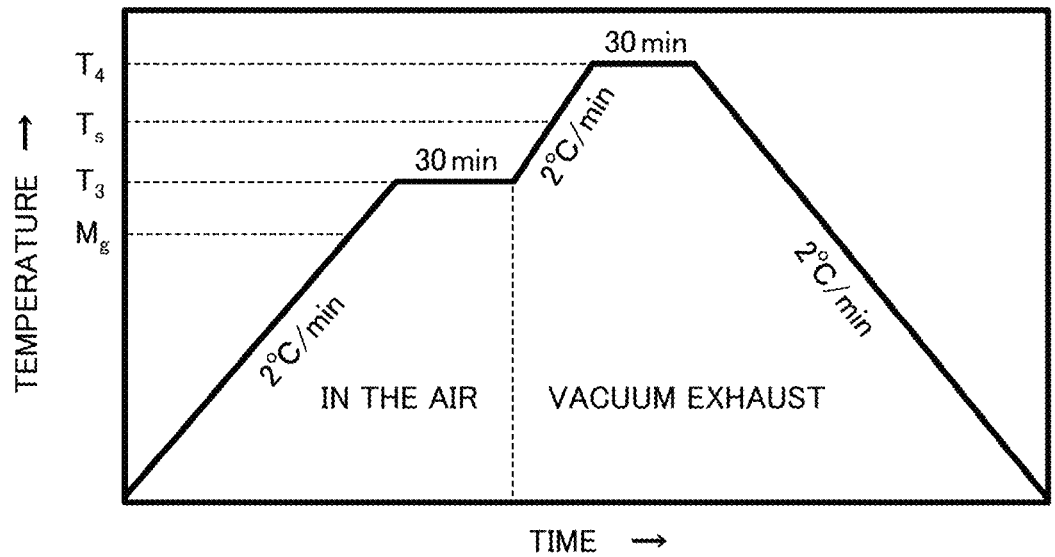
FIG. 8B is a graph showing a temperature profile when the seal part is heated in a process of depressurizing an interior space of a vacuum multilayered glass panel.

FIG. 8B is a graph showing a temperature profile when a seal part is heated in a process of depressurizing an interior space of a vacuum multilayered glass panel.

Firstly, as shown in FIG. 3A, encapsulating material paste 13 is applied with a dispenser 12 to a periphery of the first glass substrate 1 where an exhaust hole 10 and an exhaust pipe 11 are installed. Then the encapsulating material paste 13 is dried at about 150° C. for 30 minutes over a hotplate and a solvent in the encapsulating material paste 13 is evaporated and removed.

Successively, a binder resin in the encapsulating material paste is decomposed and removed through a temperature profile shown in FIG. 8A. Successively, an encapsulating material 14 is formed by being baked over the first glass substrate 1 by softening and fluidizing the particles of the low melting glass 7 contained in the encapsulating material paste 13.

As the baking conditions, a heating rate and a cooling rate are set to 2° C./min. in the atmosphere as shown in FIG. 8A. During a heating process, the binder resin is decomposed and removed by once retaining a certain temperature $T_1$ between a yield point $M_g$ and a softening point $T_s$ of the low melting glass 7 for about 30 minutes. Successively, the encapsulating material 14 is formed at the periphery of the first glass substrate 1 by raising the temperature again and retaining a certain temperature $T_2$ that is higher than the softening point $T_s$ by 20° C. to 40° C. for about 30 minutes.

The encapsulating material paste 13 changes to the encapsulating material 14 through the above processes.

Meanwhile, a heat ray reflecting film 6 is formed over a whole one surface of the second glass substrate 2 by a vapor deposition method as shown in FIGS. 4A and 4B. Then, many spacers 3 are attached over the surface of the heat ray reflecting film 6.

Successively, the first glass substrate 1 and the second glass substrate 2 manufactured through the above processes are put together so as to face each other as shown in FIG. 5A. Then, they are fixed with heat resistant clips 15 or the like as shown in FIG. 5B.

The clipped first glass substrate 1 and second glass substrate 2 are placed inside a vacuum exhaust furnace 16, an electric heater 17 is attached to an exhaust pipe 11, and the exhaust pipe 11 is connected to a vacuum pump 18 as shown in FIG. 6A.

They are firstly heated to a certain temperature $T_3$ between a yield point $M_g$ and a softening point $T_s$ of the low melting glass 7 contained in the encapsulating material 14 and retained for about 30 minutes in the atmosphere through a sealing temperature profile shown in FIG. 8B. Successively, they are heated to a temperature $T_4$ that is higher than the softening point $T_s$ by 10° C. to 30° C. while an interior space 5 is exhausted through the exhaust hole 10 and the exhaust pipe 11 as shown in FIGS. 6A and 6B. As a result, a seal part 4 is formed at the periphery by the encapsulating material 14, and the interior space 5 is in a vacuum state.

Successively, the exhaust pipe 11 is burnt off with the electric heater 17 during cooling or after cooling so that the vacuum state of the interior space 5 may be retained as shown in FIGS. 7A and 7B.

Through the above processes, a vacuum insulated multi-layered glass panel is manufactured.

EXAMPLES

The present invention is hereunder explained further in detail on the basis of specific examples. The present invention, however, is not limited to the examples featured here and includes variations of the examples.

In order to manufacture a vacuum insulated multilayered glass panel according to the present invention, firstly 42 kinds of lead-free low melting glasses used for manufacturing encapsulating material paste were manufactured experimentally.

Table 1 shows the compositions and characteristics of the experimentally manufactured lead-free low melting glass.

TABLE 1

Compositions and characteristics of lead-free low melting glass

| | Glass composition (mole %) | | | | | | | | | | | |
|---|---|---|---|---|---|---|---|---|---|---|---|---|
| No. | $V_2O_5$ | $TeO_2$ | $Ag_2O$ | $WO_3$ | $BaO$ | $K_2O$ | $P_2O_5$ | $Al_2O_5$ | $Fe_2O_3$ | $Y_2O_3$ | $La_2O_3$ | $ZnO$ |
| G-01 | 43.1 | 31.3 | — | — | — | — | 15.2 | — | 10.4 | — | — | — |
| G-02 | 37.8 | 32.3 | — | 7.5 | 22.4 | — | — | — | — | — | — | — |
| G-03 | 37.7 | 32.1 | — | 7.4 | 17.0 | — | 5.8 | — | — | — | — | — |
| G-04 | 34.4 | 31.0 | — | 7.2 | 12.0 | 8.7 | 6.7 | — | — | — | — | — |
| G-05 | 37.9 | 37.8 | — | 7.4 | 16.9 | — | — | — | — | — | — | — |
| G-06 | 34.7 | 32.2 | — | 7.4 | 25.7 | — | — | — | — | — | — | — |
| G-07 | 43.5 | 31.6 | — | 3.6 | — | — | 11.8 | — | 7.4 | — | — | 2.1 |
| G-08 | 38.1 | 36.9 | — | 7.5 | 17.0 | — | — | — | — | — | 0.5 | — |
| G-09 | 37.6 | 36.4 | — | 5.9 | 17.8 | 1.8 | — | — | — | — | 0.5 | — |
| G-10 | 27.0 | 40.0 | 12.0 | 9.0 | 5.0 | 3.0 | — | 1.0 | 3.0 | — | — | — |
| G-11 | 25.0 | 40.0 | 15.0 | 5.0 | 10.0 | 5.0 | — | — | — | — | — | — |
| G-12 | 25.0 | 40.0 | 15.0 | 9.0 | 4.0 | 3.0 | — | 1.0 | 3.0 | — | — | — |
| G-13 | 22.0 | 40.0 | 15.0 | 9.0 | 6.0 | 5.0 | — | — | — | — | 3.0 | — |
| G-14 | 25.0 | 40.0 | 17.0 | 10.0 | 3.0 | 3.0 | — | — | — | — | 2.0 | — |
| G-15 | 24.0 | 40.0 | 17.0 | 9.0 | 4.0 | 3.0 | — | — | 3.0 | — | — | — |
| G-16 | 24.0 | 40.0 | 17.0 | 9.0 | 4.0 | 3.0 | — | 3.0 | — | — | — | — |
| G-17 | 23.0 | 40.0 | 17.0 | 9.0 | 4.0 | 3.0 | — | 1.0 | 3.0 | — | — | — |
| G-18 | 22.0 | 40.0 | 22.0 | 7.0 | 3.0 | 3.0 | — | 1.0 | 2.0 | — | — | — |
| G-19 | 20.0 | 41.0 | 23.0 | 7.0 | — | 5.0 | — | 1.0 | 3.0 | — | — | — |
| G-20 | 17.5 | 37.7 | 30.8 | 4.9 | 3.2 | — | 5.8 | — | — | — | — | — |
| G-21 | 20.0 | 40.0 | 30.0 | 5.0 | 5.0 | — | — | — | — | — | — | — |
| G-22 | 20.0 | 37.5 | 35.0 | 2.0 | 5.0 | — | — | — | — | — | 0.5 | — |
| G-23 | 20.5 | 39.0 | 33.0 | 5.0 | — | — | — | — | — | — | 2.5 | — |
| G-24 | 20.3 | 42.8 | 23.9 | 4.8 | 7.8 | — | — | — | — | — | 0.3 | — |
| G-25 | 20.0 | 39.5 | 30.0 | 5.0 | 5.0 | — | — | — | — | — | 0.5 | — |
| G-26 | 20.0 | 40.0 | 30.0 | 7.0 | — | — | — | — | — | — | 3.0 | — |
| G-27 | 21.0 | 41.0 | 31.0 | 5.0 | — | — | — | — | — | — | 2.0 | — |
| G-28 | 20.5 | 39.0 | 33.0 | 5.0 | — | — | — | — | — | 0.5 | 2.0 | — |
| G-29 | 21.0 | 38.0 | 33.0 | 5.0 | — | — | — | — | — | 1.0 | 2.0 | — |
| G-30 | 21.0 | 38.0 | 31.0 | 5.0 | — | — | — | — | — | 1.0 | 2.0 | 2.0 |
| G-31 | 25.0 | 40.0 | 25.0 | 5.0 | — | — | — | — | — | 1.0 | 2.0 | 2.0 |
| G-32 | 22.0 | 40.0 | 20.0 | 5.0 | 5.0 | 6.0 | — | — | — | — | 2.0 | — |
| G-33 | 21.0 | 39.0 | 20.0 | 6.0 | 8.0 | 5.0 | — | — | — | — | 1.0 | — |

TABLE 1-continued

Compositions and characteristics of lead-free low melting glass

| | | | | | | | | | | | |
|---|---|---|---|---|---|---|---|---|---|---|---|
| G-34 | 21.0 | 40.0 | 25.0 | 7.0 | — | 3.0 | — | 1.0 | 3.0 | — | — | — |
| G-35 | 21.0 | 42.0 | 23.0 | 5.0 | — | 5.0 | — | — | 3.0 | — | 1.0 | — |
| G-36 | 21.0 | 40.0 | 25.0 | 5.0 | — | 5.0 | — | 0.5 | 3.0 | — | 0.5 | — |
| G-37 | 20.0 | 40.0 | 20.0 | 5.0 | 8.0 | 5.0 | — | — | 1.5 | — | 0.5 | — |
| G-38 | 21.0 | 42.5 | 20.0 | 5.0 | 5.0 | 9.0 | — | — | 1.0 | — | 0.5 | — |
| G-39 | 20.0 | 40.0 | 18.0 | 5.0 | 7.0 | 10.0 | — | 0.5 | — | — | 0.5 | — |
| G-40 | 21.0 | 42.0 | 16.0 | 5.0 | 5.0 | 10.0 | — | 0.5 | — | — | 0.5 | — |
| G-41 | 21.0 | 42.0 | 15.0 | 5.0 | 5.0 | 10.0 | — | 0.5 | 1.0 | — | 0.5 | — |
| G-42 | 20.0 | 40.0 | 18.0 | 5.0 | 5.0 | 10.0 | — | 0.5 | 1.0 | — | 0.5 | — |

| No. | Density (g/cm³) | Transition point $T_g$ | Yield point $M_g$ | Softening point $T_s$ | Thermal expansion coefficient ($\times 10^{-7}$/°C.) | Temperature range (°C.) |
|---|---|---|---|---|---|---|
| G-01 | 3.58 | 294 | 319 | 358 | 102 | 30-250 |
| G-02 | 4.39 | 284 | 303 | 334 | 149 | |
| G-03 | 4.23 | 295 | 314 | 357 | 128 | |
| G-04 | 4.05 | 278 | 297 | 333 | 164 | |
| G-05 | 4.43 | 281 | 297 | 331 | 141 | |
| G-06 | 4.53 | 303 | 317 | 355 | 152 | |
| G-07 | 3.69 | 281 | 308 | 353 | 102 | |
| G-08 | 4.42 | 279 | 302 | 335 | 139 | |
| G-09 | 4.36 | 275 | 300 | 332 | 148 | |
| G-10 | 4.81 | 253 | 279 | 320 | 140 | 30-200 |
| G-11 | 5.01 | 221 | 241 | 282 | 145 | |
| G-12 | 4.98 | 249 | 273 | 313 | 144 | |
| G-13 | 5.04 | 237 | 265 | 307 | 148 | |
| G-14 | 5.13 | 233 | 257 | 295 | 156 | |
| G-15 | 5.08 | 238 | 264 | 304 | 161 | |
| G-16 | 5.04 | 236 | 261 | 303 | 155 | |
| G-17 | 5.06 | 245 | 271 | 313 | 158 | |
| G-18 | 5.20 | 223 | 245 | 284 | 161 | |
| G-19 | 5.25 | 222 | 243 | 282 | 166 | |
| G-20 | 5.52 | 207 | 225 | 263 | 176 | 30-150 |
| G-21 | 5.69 | 189 | 207 | 240 | 184 | |
| G-22 | 5.67 | 174 | 196 | 231 | 194 | |
| G-23 | 5.70 | 191 | 214 | 244 | 177 | |
| G-24 | 5.45 | 209 | 227 | 263 | 173 | |
| G-25 | 5.58 | 190 | 212 | 245 | 182 | |
| G-26 | 5.55 | 204 | 230 | 265 | 175 | |
| G-27 | 5.61 | 194 | 216 | 252 | 180 | |
| G-28 | 5.64 | 184 | 206 | 244 | 191 | |
| G-29 | 5.62 | 190 | 209 | 243 | 188 | |
| G-30 | 5.64 | 194 | 217 | 252 | 176 | |
| G-31 | 5.48 | 212 | 235 | 270 | 173 | |
| G-32 | 5.15 | 209 | 234 | 275 | 165 | |
| G-33 | 5.13 | 212 | 235 | 276 | 163 | |
| G-34 | 5.28 | 213 | 243 | 280 | 165 | |
| G-35 | 5.22 | 215 | 239 | 280 | 167 | |
| G-36 | 5.18 | 214 | 237 | 278 | 170 | |
| G-37 | 5.11 | 216 | 243 | 278 | 168 | |
| G-38 | 5.15 | 212 | 233 | 275 | 178 | |
| G-39 | 5.08 | 207 | 229 | 268 | 180 | |
| G-40 | 5.04 | 203 | 224 | 261 | 178 | |
| G-41 | 4.99 | 216 | 238 | 277 | 174 | |
| G-42 | 5.07 | 209 | 230 | 267 | 177 | |

Those lead-free low melting glasses G-01 to G-42 are environmentally and safely friendly, as they substantially do not contain harmful lead.

As the glass raw materials, the powders of $V_2O_3$ made by Shinko Chemical Co., Ltd., $TeO_2$ made by Kojundo Chemical Laboratory Co., Ltd., $Ag_2O$ made by Wako Pure Chemical Industries, Ltd., $WO_3$ made by Kojundo Chemical Laboratory Co., Ltd., $BaCO_3$ made by Kojundo Chemical Laboratory Co., Ltd., $K_2CO_3$ made by Kojundo Chemical Laboratory Co., Ltd., $P_2O_3$ made by Kojundo Chemical Laboratory Co., Ltd., $Al_2O_3$ made by Kojundo Chemical Laboratory Co., Ltd., $Fe_2O_3$ made by Kojundo Chemical Laboratory Co., Ltd., $Y_2O_3$ made by Kojundo Chemical Laboratory Co., Ltd., $La_2O_3$ made by Kojundo Chemical Laboratory Co., Ltd., and ZnO made by Kojundo Chemical Laboratory Co., Ltd. were used.

The glass raw materials were weighed, blended, and mixed to a total of about 200 to 300 g and were put into a platinum crucible or a quartz crucible. A crucible was placed in a glass melting furnace (electric furnace), heated to 750° C. to 950° C. at a heating rate of about 10° C./min, and retained for one hour while being stirred with an alumina stick in order to equalize the molten liquid in the crucible. Successively, the crucible was taken out from the glass melting furnace, the molten liquid in the crucible was poured over a stainless steel plate, and thus the lead-free low melting glasses G-01 to G-42 shown Table 1 were manufactured respectively.

Platinum crucibles were used for G-01 to G-09 that are $V_2O_5$—$TeO_2$-based lead-free low melting glasses and quartz crucibles were used for G-10 to G-42 that are $V_2O_5$—$TeO_2$—$Ag_2O$-based lead-free low melting glasses, respectively. Further, G-01 to G-09 were melted at 950° C., G-10 to G-19 are melted at 850° C., and G-20 to G-42 were melted at 750° C.

The densities, characteristic temperatures, and thermal expansion coefficients of the respective experimentally manufactured lead-free low melting glasses G-01 to G-42 were measured. The characteristic temperatures were measured by differential thermal analysis (DTA) of glass powder. Here, a microcell type was used so that characteristic points in a DTA curve specific to glass might appear clearly.

Figure 9:
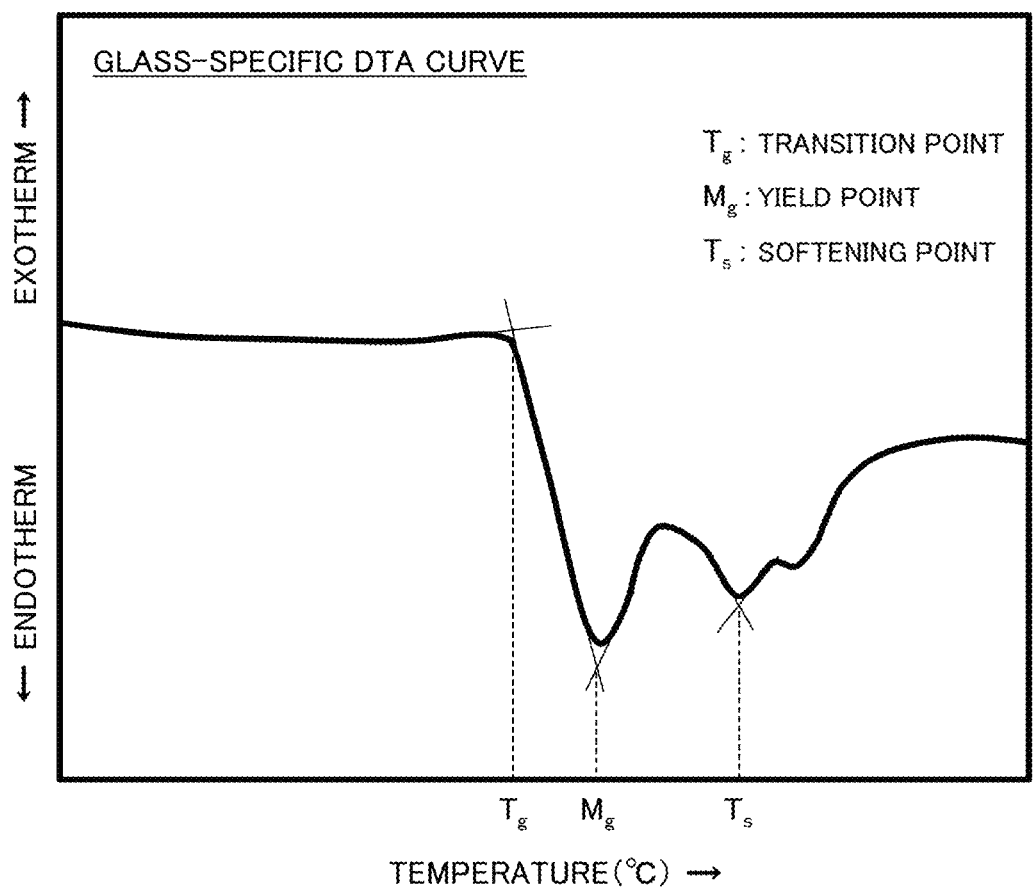
FIG. 9 is a graph showing an example of a typical differential thermal analysis curve (DTA curve) specific to glass.

FIG. 9 is a graph showing an example of a typical DTA curve of glass.

In FIG. 9, a start temperature of a first endothermic peak is a transition point $T_g$, then the endothermic peak temperature is a yield point $M_g$, and a second endothermic peak temperature is a softening point $T_s$. Those characteristic temperatures are obtained generally by a tangent method. The characteristic temperatures are defined by the viscosities of glass respectively and $T_g$ is a temperature corresponding to $10^{13.3}$ poise, $M_g$ is a temperature corresponding to $10^{11.0}$ poise, and $T_s$ is a temperature corresponding to $10^{7.65}$ poise.

Successively, the experimentally manufactured lead-free low melting glasses G-01 to G-42 were pulverized to an average particle size ($D_{50}$) of about 1 to 3 μm by a jet mill and were used for encapsulating material paste. Here, an average particle size ($D_{50}$) of lead-free low melting glass was measured by using a laser diffraction/scattering particle size distribution analyzer LA-950V2 made by HORIBA, Ltd.

Tables 2 and 3 show low thermal expansion filler particles and spherical glass beads used for encapsulating material paste according to the present invention.

The low thermal expansion filler particles having an average particle size ($D_{50}$) of 1 to 15 μm were used. The average particle size ($D_{50}$) was measured by using a laser diffraction/scattering particle size distribution analyzer LA-950V2 made by HORIBA, Ltd. The spherical glass beads are classified to an intended size range with a sieve. The average diameter ($D_{50}$) was measured by using a laser diffraction/scattering particle size distribution analyzer LA-950V2 made by HORIBA, Ltd.

TABLE 2

Densities and thermal expansion coefficients of low thermal expansion filler particles

| No. | Low thermal expansion filler particles | Density (g/cm³) | Thermal expansion coefficient (×10⁻⁷/° C.) |
|---|---|---|---|
| F-01 | Zirconium phosphate tungstate $Zr_2(WO_4)(PO_4)_2$ | 4.0 | −40 |
| F-02 | Quartz glass $SiO_2$ | 2.2 | 5 |
| F-03 | β-eucryptite $Li_2O \cdot Al_2O_3 \cdot 2SiO_2$ | 2.4 | −60 |
| F-04 | Cordierite $2MgO \cdot 2Al_2O_3 \cdot 5SiO_2$ | 2.5 | 1 |

TABLE 3

Densities and thermal expansion coefficients of spherical glass beads

| No. | Glass beads | Density (g/cm³) | Thermal expansion coefficient (×10⁻⁷/° C.) | Average particle size $D_{50}$ (μm) | Range of particle size (μm) |
|---|---|---|---|---|---|
| B-11 | Soda lime glass ($SiO_2$—$Na_2O$—CaO-based glass) | 2.5 | 85 | 46 | Not less than 20 to less than 106 |
| B-12 | | | | 88 | Not less than 38 to less than 150 |
| B-13 | | | | 125 | Not less than 63 to less than 180 |
| B-14 | | | | 143 | Not less than 75 to less than 212 |
| B-15 | | | | 184 | Not less than 106 to less than 250 |
| B-21 | Borosilicate glass ($SiO_2$—$B_2O_3$—$Na_2O$-based glass) | 2.3 | 57 | 145 | Not less than 75 to less than 212 |
| B-31 | Quartz glass ($SiO_2$ glass) | 2.2 | 5 | 149 | Not less than 75 to less than 212 |

Encapsulating material paste was manufactured by using the particles of the lead-free low melting glass in Table 1, the low thermal expansion filler in Table 2, the spherical glass beads in Table 3, a resin binder, and a solvent.

As a resin binder, ethyl cellulose or nitrocellulose was used when the lead-free low melting glasses G-01 to G-09 were used, and aliphatic polycarbonate was used when the lead-free low melting glasses G-10 to G-42 were used. As a solvent, butyl carbitol acetate was used when the lead-free low melting glasses G-01 to G-09 were used and both propylene carbonate and a terpene solvent are used when the lead-free low melting glasses G-10 to G-42 were used.

Example 1

In the present example, a bonded body simulating a seal part of vacuum insulated multilayered glass according to the present invention was manufactured by using encapsulating material paste according to the present invention and the reliability of the bonded part was evaluated. Specifically, encapsulating material paste according to the present invention was used, two glass substrates were bonded, and the bond strength of a bonded body was evaluated by shear stress. As a comparative example, encapsulating material paste not including the spherical glass beads was used and on the basis of this the effectiveness of including the glass beads was confirmed.

A manufacturing method of a bonded body according to the present example is shown in FIGS. 10A to 11B.

Figure 10A:
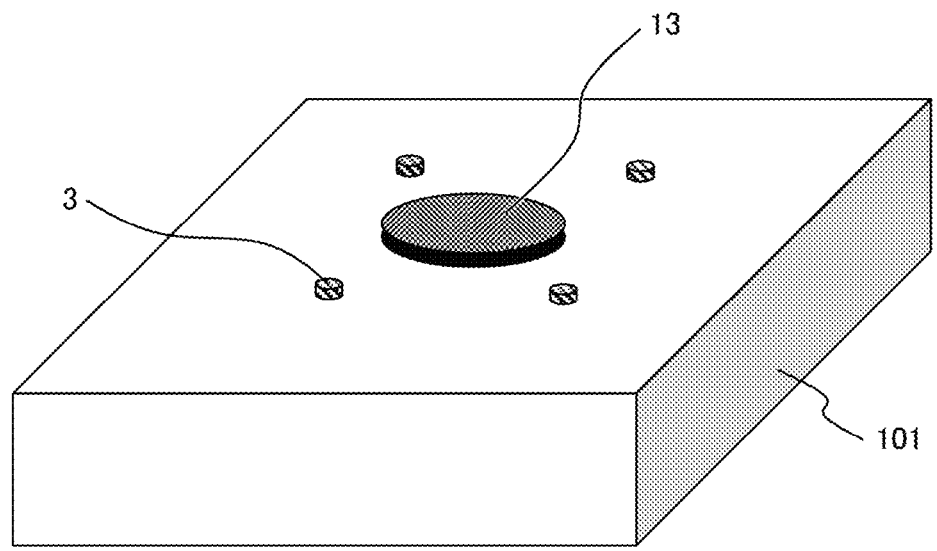
FIG. 10A is a schematic perspective view showing a state of placing encapsulating material paste and spacers over a glass substrate, which is a part of a manufacturing method of a bonded body simulating a seal part of a vacuum insulated multilayered glass panel.

FIG. 10A is a schematic perspective view showing a state of placing encapsulating material paste and spacers over a glass substrate, which is a part of a manufacturing method of a bonded body simulating a seal part of a vacuum insulated multilayered glass panel.

Figure 10B:
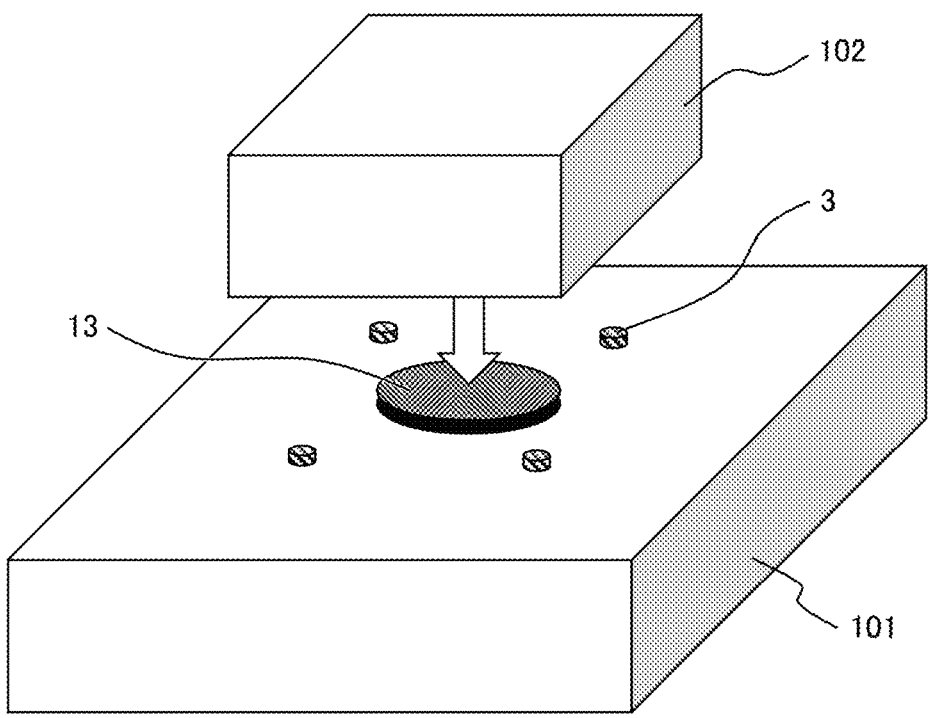
FIG. 10B is a schematic perspective view showing a process of stacking another glass substrate over the glass substrate in FIG. 10A.

FIG. 10B is a schematic perspective view showing a process of stacking another glass substrate over the glass substrate in FIG. 10A.

Figure 11A:
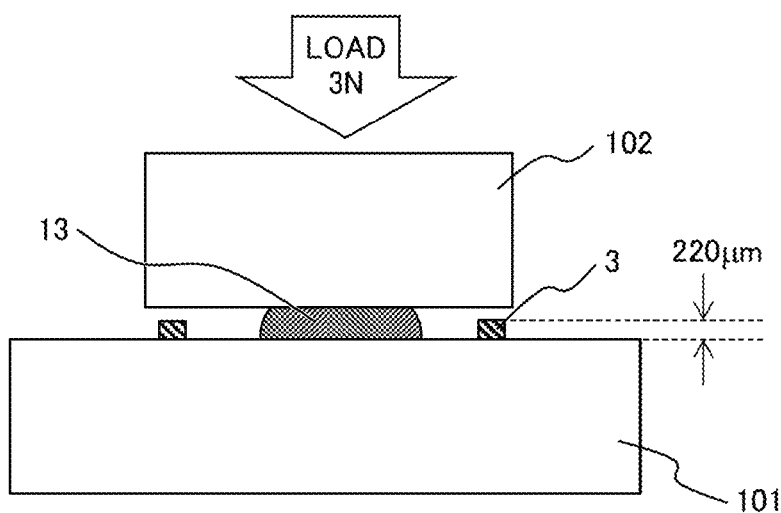
FIG. 11A is a schematic sectional view showing a process of pressing the two glass substrates after the process in FIG. 10B.

FIG. 11A is a schematic sectional view showing a process of pressing the two glass substrates after the process in FIG. 10B.

Figure 11B:
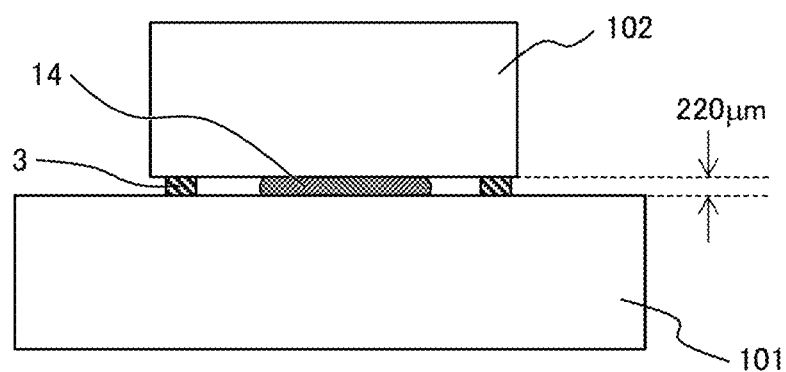
FIG. 11B is a schematic sectional view showing a state of completing the process in FIG. 11A.

FIG. 11B is a schematic sectional view showing a state of completing the process in FIG. 11A.

As glass substrates 101 and 102, quite ordinary soda lime glass 5 mm in thickness was used. The size of the glass substrate 101 is 20×20 mm square and the size of the glass substrate 102 was 10×10 mm square.

Firstly, as shown in FIG. 10A, encapsulating material paste 13 was applied over the upper surface of the glass substrate 101 so as to have a diameter of 5 mm and a thickness of about 500 to 600 μm. Further, four metal-made spacers 3 having 220 μm in height were placed. After they were dried at 150° C. for 30 minutes, the glass substrate 102 was put together as shown in FIG. 10B.

Then as shown in FIG. 11A, they were bonded through the temperature profile shown in FIG. 8A while a load of 3 N was applied from above the glass substrate 102. On this occasion, as shown in FIG. 11B, the bond thickness was adjusted so as to be 220 μm by the four spacers 3. During the process, the encapsulating material paste 13 changes to an encapsulating material 14.

Figure 12:
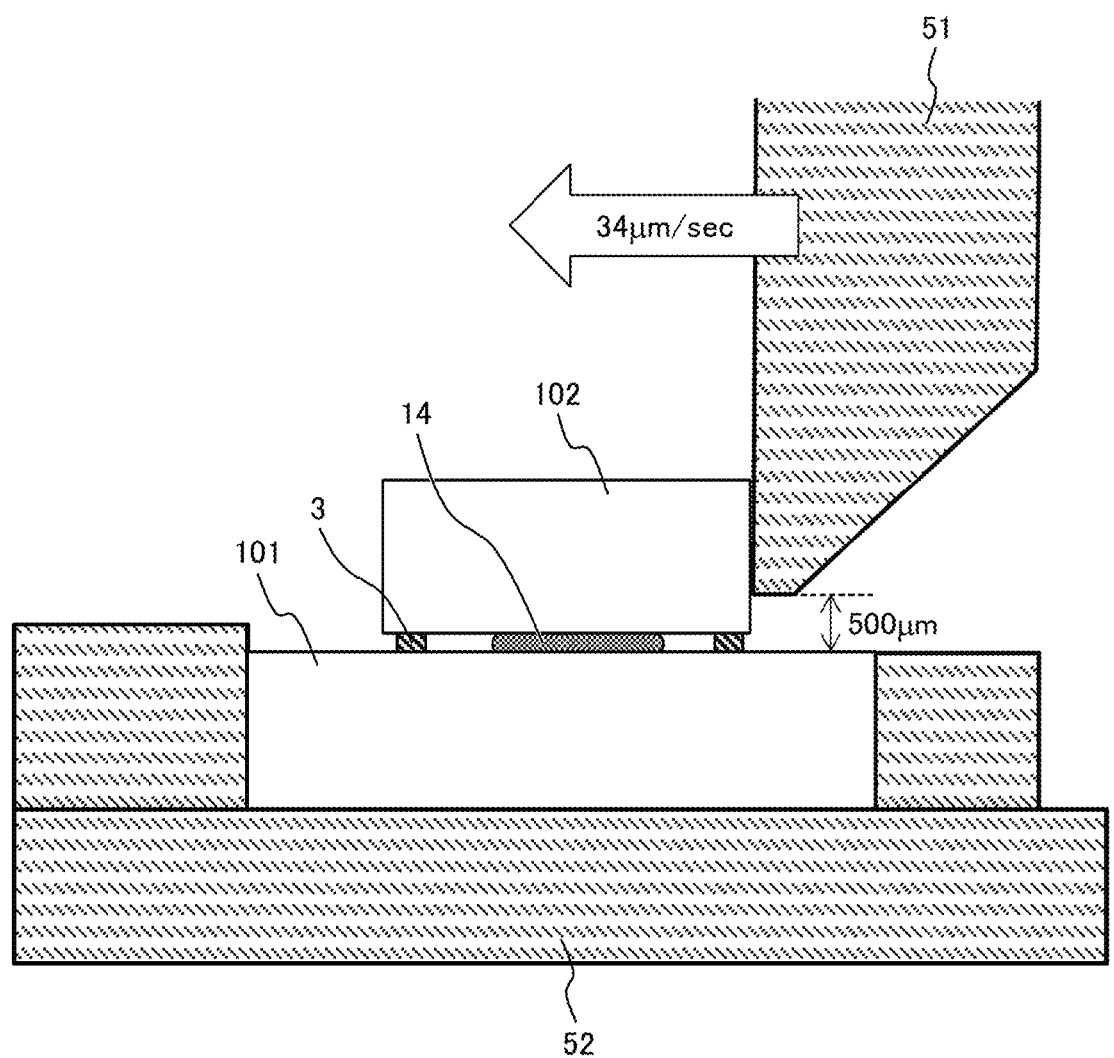
FIG. 12 is a schematic sectional view showing a part of a bond strength test apparatus for a bonded body simulating a seal part of a vacuum insulated multilayered glass panel.

FIG. 12 shows a configuration of an apparatus to measure a bond strength of a bonded body obtained by the above manufacturing method.

As shown in the figure, a bonded body is fixed to a bonded body fixing jig 52, the bonded body including glass substrates 101 and 102; and an encapsulating material 14 and spacers 3 interposed between the substrates. Then, external force is applied laterally to the glass substrate 102 by a shear jig 51. On this occasion, the lower end of the shear jig 51 is adjusted so as to be positioned 500 μm apart from the upper surface of the glass substrate 101. Further, the moving speed of the shear jig 51 is set to 34 μm/sec.

Five bonded bodies were manufactured for each of the example and the comparative example, and an average value (average bond strength) was calculated from the bond strengths of the five bonded bodies measured under the above conditions. By comparing the average values, a degree of superiority of encapsulating material paste was evaluated.

The encapsulating material paste used in the present example includes the lead-free low melting glasses G-01 to G-42 shown in Table 1, the low thermal expansion filler particles F-01 shown in Table 2, and the spherical glass beads B-14 shown in Table 3 as the solid content. The volume fractions of the lead-free low melting glasses G-01 to G-42 and the low thermal expansion filler particles F-01 in the solid content were decided in consideration of the thermal expansion of the soda lime glass used for the glass substrates 101 and 102. Further, the volume fraction of the spherical glass beads B-14 in the solid content was set to 20% to 30% by volume. In this way, five bonded bodies for each were manufactured as the present example, and an average bond strength was obtained.

Table 4 shows volume fractions of the solid content in encapsulating material paste, the bonding conditions, and the bond strength improvement rates of the manufactured bonded bodies.

Meanwhile, the bond strength improvement rates of the bonded bodies A-01 to A-42 are values based on a bonded body not including the spherical glass beads B-14 in the solid content. In other words, the bond strength improvement rates of the bonded bodies A-01 to A-42 are values calculated by using an average bond strength of the bonded bodies of the comparative example as a denominator and a value obtained by subtracting the average bond strength of the bonded bodies of the comparative example from an average bond strength of the bonded bodies of the present example as a numerator. In the case of a bonded body of the comparative example, in other words in the case of not including the spherical glass beads B-14, any of the bonded bodies had an average bond strength of about 10 to 20 MPa in terms of shear stress. Further, in the range, an average bond strength tended to increase as lead-free low melting glass of a higher softening point $T_s$ was used.

TABLE 4

Solid content volume fractions in encapsulating material paste, bonding conditions, and bond strength improvement rate of manufactured bonded body

| Bonded body No. | Solid content volume fraction in encapsulating material paste (volume %) | | | Bonding conditions | | Bond strength improvement rate (%) |
|---|---|---|---|---|---|---|
| | Lead-free low melting glass | Low thermal expansion filler particles F-01 | Spherical glass beads B-14 | Temperature $T_1$ (° C.) | Temperature $T_2$ (° C.) | |
| A-01 | G-01 56 | 14 | 30 | 350 | 390 | 38 |
| A-02 | G-02 45 | 30 | 25 | 325 | 370 | 29 |
| A-03 | G-03 51 | 24 | 25 | 350 | 390 | 33 |
| A-04 | G-04 42 | 33 | 25 | 325 | 370 | 24 |
| A-05 | G-05 47 | 28 | 25 | 325 | 370 | 27 |
| A-06 | G-06 44 | 31 | 25 | 350 | 390 | 25 |
| A-07 | G-07 56 | 14 | 30 | 350 | 390 | 35 |
| A-08 | G-08 48 | 27 | 25 | 325 | 370 | 32 |
| A-09 | G-09 45 | 30 | 25 | 325 | 370 | 30 |
| A-10 | G-10 47 | 28 | 25 | 300 | 350 | 35 |
| A-11 | G-11 46 | 29 | 25 | 270 | 320 | 31 |
| A-12 | G-12 46 | 29 | 25 | 300 | 350 | 36 |
| A-13 | G-13 45 | 30 | 25 | 290 | 340 | 34 |
| A-14 | G-14 43 | 32 | 25 | 280 | 330 | 29 |

TABLE 4-continued

Solid content volume fractions in encapsulating material paste, bonding conditions, and bond strength improvement rate of manufactured bonded body

| | Solid content volume fraction in encapsulating material paste (volume %) | | | Bonding conditions | | Bond |
|---|---|---|---|---|---|---|
| Bonded body No. | Lead-free low melting glass | Low thermal expansion filler particles F-01 | Spherical glass beads B-14 | Temperature $T_1$ (° C.) | Temperature $T_2$ (° C.) | strength improvement rate (%) |
| A-15 | G-15 42 | 33 | 25 | 290 | 340 | 26 |
| A-16 | G-16 43 | 32 | 25 | 290 | 340 | 27 |
| A-17 | G-17 43 | 32 | 25 | 300 | 350 | 25 |
| A-18 | G-18 42 | 33 | 25 | 270 | 320 | 24 |
| A-19 | G-19 41 | 34 | 25 | 270 | 320 | 22 |
| A-20 | G-20 42 | 38 | 20 | 250 | 290 | 29 |
| A-21 | G-21 42 | 38 | 20 | 230 | 270 | 27 |
| A-22 | G-22 41 | 39 | 20 | 220 | 260 | 25 |
| A-23 | G-23 40 | 35 | 25 | 230 | 270 | 28 |
| A-24 | G-24 40 | 30 | 30 | 250 | 290 | 31 |
| A-25 | G-25 40 | 30 | 30 | 230 | 280 | 32 |
| A-26 | G-26 40 | 35 | 25 | 250 | 300 | 24 |
| A-27 | G-27 40 | 35 | 25 | 240 | 290 | 27 |
| A-28 | G-28 41 | 39 | 20 | 230 | 280 | 22 |
| A-29 | G-29 41 | 39 | 20 | 230 | 280 | 23 |
| A-30 | G-30 42 | 38 | 20 | 240 | 290 | 27 |
| A-31 | G-31 42 | 38 | 20 | 260 | 310 | 29 |
| A-32 | G-32 42 | 33 | 25 | 260 | 310 | 30 |
| A-33 | G-33 42 | 28 | 30 | 260 | 310 | 32 |
| A-34 | G-34 45 | 35 | 20 | 260 | 310 | 34 |
| A-35 | G-35 42 | 33 | 25 | 260 | 310 | 28 |
| A-36 | G-36 40 | 30 | 30 | 260 | 310 | 24 |
| A-37 | G-37 42 | 33 | 25 | 260 | 310 | 23 |
| A-38 | G-38 42 | 38 | 20 | 260 | 310 | 24 |
| A-39 | G-39 45 | 35 | 20 | 250 | 300 | 28 |
| A-40 | G-40 45 | 35 | 20 | 250 | 290 | 26 |
| A-41 | G-41 42 | 33 | 25 | 260 | 300 | 30 |
| A-42 | G-42 45 | 35 | 20 | 250 | 290 | 33 |

From the present table, it is obvious that any of the bonded bodies A-01 to A-42 in the present example including the spherical glass beads B-14 has an average bond strength improved from the comparative example.

When a destroyed part of a bonded body in the comparative example was observed, any of the bonded bodies was in the state of vertically separating the encapsulating material 14 shown in FIG. 12, in other words, a nearly center part in the bond thickness of 220 μm broke in most cases. In contrast, when a broken part of the bonded bodies A-01 to A-42 in the present example including the spherical glass beads B-14 was observed, in any of the bonded bodies, it could be seen that cracks were inhibited from propagating in the encapsulating material 14 by the existence of the spherical glass beads B-14. This is thought to be the reason why the bond strength improved.

From this, it was clarified that the mixing of spherical glass beads into an encapsulating material or paste of an encapsulating material was effective for improving the strength of a bonded body, in other words for improving reliability. It goes without saying that this can be applied effectively to the hermetic sealing of vacuum insulated multilayered glass at a low temperature.

Example 2

In the present example, influence of a volume fraction of spherical glass beads in a solid content in encapsulating material paste on a bond strength was examined by manufacturing bonded bodies of FIG. 11B similarly to Example 1 and evaluating an average bond strength. Encapsulating material paste is manufactured by using G-08, G-10, G-25, G-36, and G-42 in Table 1 for lead-free low melting glass, F-01 in Table 2 for low thermal expansion filler particles, and B-14 in Table 3 for spherical glass beads.

Meanwhile, the ratio of the volume fractions of the lead-free low melting glasses G-08, G-10, G-25, G-36, and G-42 and the low thermal expansion filler particles F-01 was kept constant in consideration of the thermal expansion of glass substrates 101 and 102 similarly to Example 1 and the volume fraction of the spherical glass beads B-14 was changed. Since the thermal expansion coefficients of the lead-free low melting glasses G-25, G-36, and G-42 are larger than those of G-08 and G-10, it is necessary to reduce the volume fraction of the lead-free low melting glass but increase the volume fraction of the low thermal expansion filler particles in order to conform to the thermal expansion of the glass substrates 101 and 102.

Figure 13:
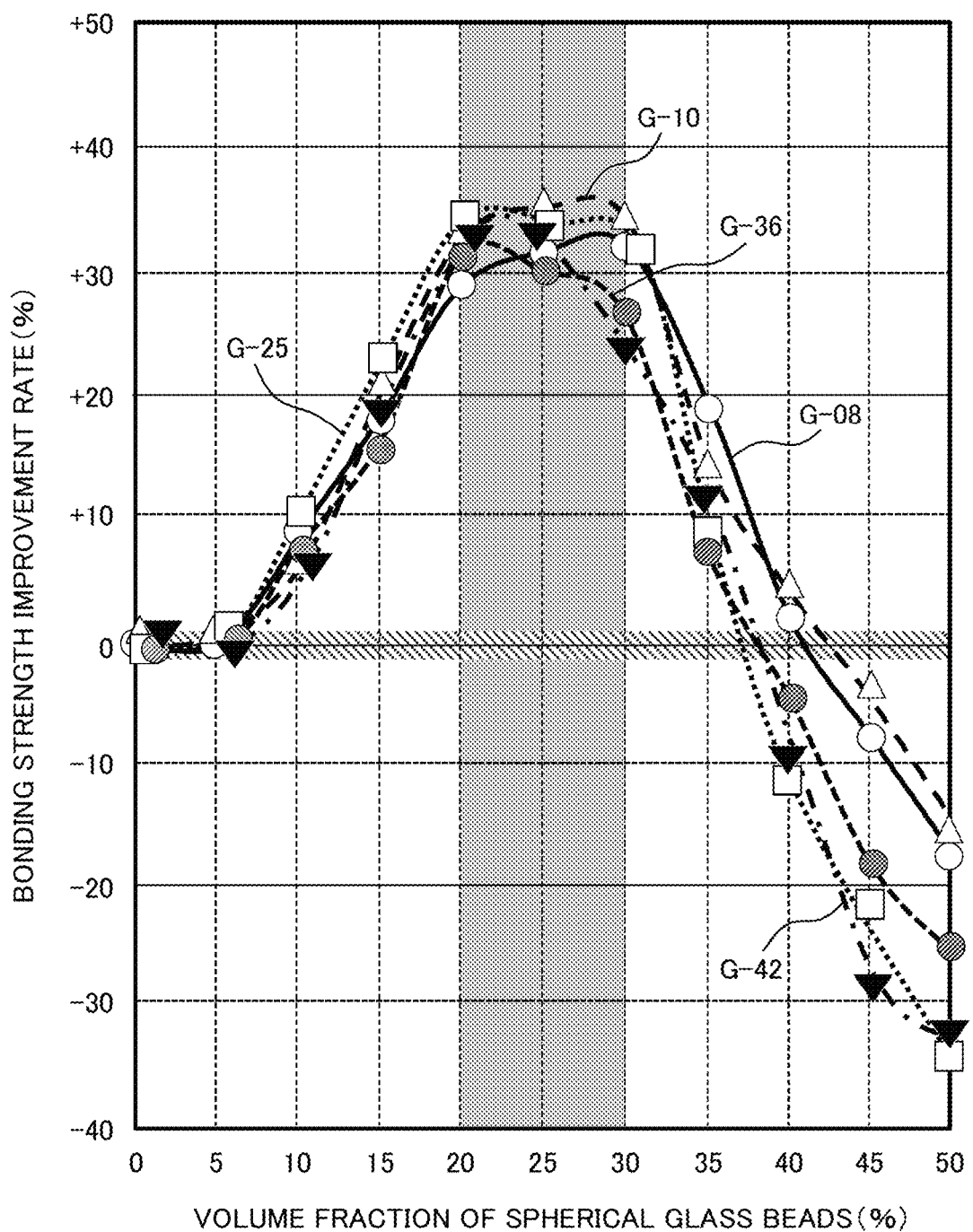
FIG. 13 is a graph showing a relationship between a bond strength improvement rate of a bonded body simulating a seal part of a vacuum insulated multilayered glass panel and a volume fraction of spherical glass beads in a solid content in encapsulating material paste.

FIG. 13 is a graph showing a relationship between a bond strength improvement rate of a bonded body and a volume fraction of spherical glass beads B-14 in a solid content in encapsulating material paste.

As shown in the graph, no matter which lead-free low melting glass is used, the effect of bond strength improvement is scarcely recognized when the volume fraction of the spherical glass beads B-14 is less than 10% by volume. The bond strength increases as the volume fraction of the glass beads increases when the volume fraction is 10% to 20% by volume, and the maximum value is obtained when the volume fraction is in the range of 20% to 30% by volume. The bond strength lowers when the volume fraction exceeds 30% by volume. Here, up to a volume fraction of 35% by volume even when a volume fraction exceeds 30% by volume, the bond strength improvement rate took a positive value and the bond strength was larger than the case of not including the spherical glass beads B-14.

With regard to the bond strength at 40% by volume, the bond strength in the case of using the lead-free low melting glass G-08 or G-10 was almost the same as the case of not including the spherical glass beads B-14, and the bond strength in the case of using the lead-free low melting glass G-25, G-36, or G-42 was lower than the case of not including the spherical glass beads B-14. Further, even when the volume fraction exceeded 40% by volume, the bond strength just simply lowered. A possible reason is thought to be that the volume fraction of the lead-free low melting glass is insufficient in bonding between the glass substrates 101 and 102 and the spherical glass beads. Further, it is considered that, because of this, the volume fraction of the lead-free low melting glass was smaller in the case of using G-25, G-36, or G-42 than in the case of using G-08 or G-10 as the lead-free low melting glass and the decline rate of the bond strength was large when the volume fraction of the spherical glass beads B-14 exceeds 35% by volume. It is considered that a volume fraction of the lead-free low melting glass in a solid content in encapsulating material paste is required to be at least 35% by volume or more.

As stated above, in encapsulating material paste, a volume fraction of glass beads is desirably 10% to 35% by volume and particularly 20% to 30% by volume is effective. Further, a volume fraction of lead-free low melting glass is desirably 35% by volume or more. It is inferred easily that this result is effectively reflected in the application of a vacuum insulated multilayered glass panel to low-temperature hermetic sealing.

Further, in the present example, with the low thermal expansion filler particles F-02 to F-04 other than F-01 in Table 2 too, bonded bodies similar to the above bonded bodies were manufactured and evaluated and examined.

As shown in Table 2, the low thermal expansion filler particles F-01 and F-03 have large negative thermal expansion coefficients. Further, the low thermal expansion fillers F-02 and F-04 have thermal expansion coefficients close to zero. Generally, the smaller the thermal expansion coefficient of low thermal expansion filler particles, the more conformable to the thermal expansion coefficient of glass substrates 101 and 102. Then on such an occasion, it is effective because the volume fraction of the lead-free low melting glass can be increased. Thinking like this, the low thermal expansion filler particles F-03 having the smallest thermal expansion coefficient in Table 2 are the most effective low thermal expansion filler particles.

However, the wettability of F-03 with any of the $V_2O_5$—$TeO_2$-based and $V_2O_5$—$TeO_2$—$Ag_2O$-based lead-free low melting glasses G-01 to G-42 shown in Table 1 is insufficient in comparison with the low thermal expansion filler particles F-01, and hence a dense bonded part is hardly obtained. Further, a desired low thermal expansion coefficient is hardly obtained. Even though spherical glass beads are mixed therefore, expected effect of bond strength improvement is hardly obtained.

As a result of examining the low thermal expansion filler particles F-04 too, the thermal expansion coefficient was not so small as the low thermal expansion filler particles F-03 but a similar result was obtained. It is thought to be necessary to apply such surface treatment as to improve wettability with the $V_2O_5$—$TeO_2$-based lead-free low melting glass and the $V_2O_5$—$TeO_2$—$Ag_2O$-based lead-free low melting glass shown in Table 1 over surfaces of the filler particles when the low thermal expansion filler particles F-03 or F-04 are used.

The wettability of the low thermal expansion filler particles F-02 with the $V_2O_5$—$TeO_2$-based lead-free low melting glass and the $V_2O_5$—$TeO_2$—$Ag_2O$-based lead-free low melting glass was good in comparison with the low thermal expansion filler particles F-03 and F-04. As low thermal expansion filler particles, however, the thermal expansion coefficient of F-02 is not so small.

When the $V_2O_5$—$TeO_2$—$Ag_2O$-based lead-free low melting glass having a very large thermal expansion coefficient was used for encapsulating material paste, it was effective to use the low thermal expansion filler particles F-01 having a negative thermal expansion coefficient in the low thermal expansion filler particles shown in Table 2. Even with this result, it goes without saying that this can be applied effectively to the low temperature hermetic sealing of a vacuum insulated multilayered glass panel.

Example 3

In the present example, influence of an average particle size ($D_{50}$) of spherical glass beads in a solid content in encapsulating material paste on a bond strength was examined by manufacturing bonded bodies shown in FIG. 11B similarly to Example 1 and evaluating an average bond strength of the bonded bodies. As the spacers 3 shown in FIG. 11B, however, metal-made spacers having 250 μm in height were used. Further, in conformity with that, coating thickness of the encapsulating material paste 13 was also increased to 600 μm or larger.

Encapsulating material paste was manufactured by using G-07, G-12, G-24, G-34, and G-39 in Table 1 as the lead-free low melting glass, F-01 in Table 2 as the low thermal expansion filler particles, and B-11 to B-15 in Table 3 as the spherical glass beads. Here, the ratio of the volume fractions of the lead-free low melting glasses G-07, G-12, G-24, G-34, and G-39 and the low thermal expansion filler particles F-01 was determined in consideration of the thermal expansion of glass substrates 101 and 102 similarly to Example 1.

All the spherical glass beads B-11 to B-15 are soda lime glass as shown in Table 3, which is the same raw material as glass substrates 101 and 102. The average particle sizes ($D_{50}$) were 46 μm in the case of B-11, 88 μm in the case of B-12, 125 μm in the case of B-13, 143 μm in the case of B-14, and 184 μm in the case of B-15. The height 250 μm of the spacers 3 was determined in consideration of the maximum particle size of the spherical glass beads, specifically the maximum particle size of B-15 having the largest average particle size ($D_{50}$). Further, the volume fractions of the spherical glass beads B-11 to B-15 are decided as 30% by volume in the case of using the lead-free low melting glass G07 or G-24, 25% by volume in the case of using G-12, and 20% by volume in the case of using G-34b or G-39.

Figure 14:
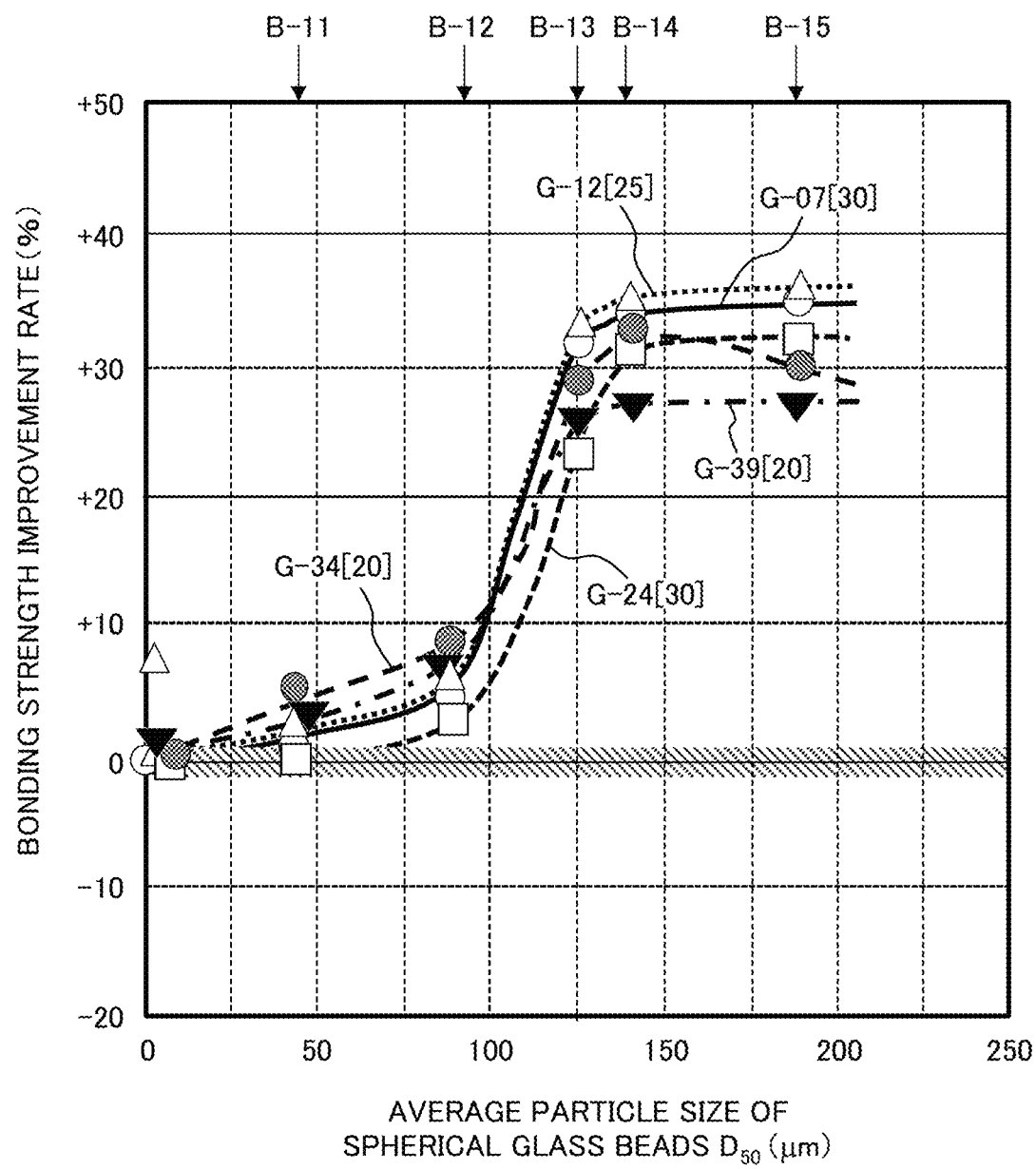
FIG. 14 is a graph showing a relationship between a bond strength improvement rate of a bonded body simulating a seal part of a vacuum insulated multilayered glass panel and an average particle size ($D_{50}$) of spherical glass beads in a solid content in encapsulating material paste.

FIG. 14 is a graph showing a relationship between a bond strength improvement rate of a bonded body and an average particle size ($D_{50}$) of spherical glass beads contained in encapsulating material paste. The numerals in the parentheses [ ] in the figure represent contents of the spherical glass beads by volume.

No matter which lead-free low melting glass is used, the effect of bond strength improvement is small when an average particle size ($D_{50}$) of spherical glass beads is less than 100 μm. In contrast, when $D_{50}$ was 125 μm or larger, a large bond strength improvement effect was obtained.

When a destroyed part of a bonded body was observed, with an average particle size ($D_{50}$) of spherical glass beads being less than 100 μm, the state where the encapsulating material 14 shown in FIG. 12 was vertically broken was observed, in other words, a nearly center part in the bond thickness of 250 μm broke in most cases. In contrast, with an average particle size ($D_{50}$) of spherical glass beads being 125 μm or larger, which was not less than half of the bond thickness 250 μm, it was observed that cracks were inhibited from propagating in the encapsulating material 14 by the spherical glass beads.

It was clarified from the above that it was effective to set an average particle size ($D_{50}$) of spherical glass beads to not less than half of a bond thickness in order to improve the bond strength of a bonded body. Further, it is inferred easily that this result is effectively reflected in the application of a vacuum insulated multilayered glass panel to low-temperature hermetic sealing. In a vacuum insulated multilayered glass panel, since a distance between two glass substrates, namely a height of spacers and a thickness of a seal part, is generally in the range of 100 to 300 μm, it is appropriate that an average diameter ($D_{50}$) of spherical glass beads is about not less than 50 μm to not more than 200 μm.

Example 4

In the present example, influence of difference of the raw materials of spherical glass beads in a solid content in encapsulating material paste on a bond strength was examined by manufacturing bonded bodies shown in FIG. 11B similarly to Example 1 and evaluating an average bond strength of the bonded bodies.

Encapsulating material paste was manufactured by using G-05, G-17, G-33, and G-40 in Table 1 as the lead-free low melting glass, F-01 in Table 2 as the low thermal expansion filler particles, and B-14, B-21, and B-31 in Table 3 as the spherical glass beads. The raw materials of the spherical glass beads B-14, B-21, and B-31 were different as shown in Table 3 but the spherical glass beads were classified with the same sieve to the particle size of not less than 75 μm to less than 212 μm. The respective raw materials of the spherical glass beads are soda lime glass in the case of B-14, borosilicate glass in the case of B-21, and quartz glass in the case of B-31. If the raw materials are different like this, the physical properties such as a density, a thermal expansion coefficient, etc. are different even though the range of the particle sizes is the same. Since the thermal expansion coefficients of the spherical glass beads are different, in consideration of this in the present example, the volume fractions of the respective solid contents in encapsulating material paste were decided in conformity with the thermal expansion of glass substrates 101 and 102.

Table 5 shows volume fractions of the solid content in encapsulating material paste, the bonding conditions, and the bond strength improvement rates of the manufactured bonded bodies. Here, the bond strength improvement rates of the bonded bodies A-05a to A-05C, A-17a to A-17c, A-33a to A-33c, and A-40a to A-40c are values based on an average bond strength of bonded bodies, which are comparative examples, manufactured by using encapsulating material paste including the lead-free low melting glass G-05, G-17, G-33, or G-40 and the low thermal expansion filler particles F-01 but not including spherical glass beads as the solid content. The volume fractions of the lead-free low melting glass and the low thermal expansion filler particles were determined in consideration of the thermal expansion of the soda lime glass used for glass substrate 101 and 102.

TABLE 5

Solid content volume fractions in encapsulating material paste, bonding conditions, and bond strength improvement rate of manufactured bonded body

| Bonded body No. | Lead-free low melting glass | Low thermal expansion filler particles F-01 | Spherical glass beads | | Temperature $T_1$ (° C.) | Temperature $T_2$ (° C.) | Bond strength improvement rate (%) |
|---|---|---|---|---|---|---|---|
| A-05a | G-05 | 47 | 28 | B-14 | 25 | 325 | 370 | 27 |
| A-05b |  | 50 | 25 | B-21 |  |  |  | 20 |
| A-05c |  | 57 | 18 | B-31 |  |  |  | 5 |
| A-17a | G-17 | 43 | 32 | B-14 | 25 | 300 | 350 | 25 |
| A-17b |  | 46 | 29 | B-21 |  |  |  | 15 |
| A-17c |  | 52 | 23 | B-31 |  |  |  | 3 |
| A-33a | G-33 | 42 | 28 | B-14 | 30 | 260 | 310 | 32 |
| A-33b |  | 45 | 25 | B-21 |  |  |  | 24 |
| A-33c |  | 50 | 20 | B-31 |  |  |  | -12 |
| A-40a | G-40 | 45 | 35 | B-14 | 20 | 250 | 290 | 26 |
| A-40b |  | 47 | 33 | B-21 |  |  |  | 17 |
| A-40c |  | 51 | 29 | B-31 |  |  |  | -15 |

In any bonded body of the bonded bodies A-05a to A-05C, A-17a to A-17c, A-33a to A-33c, and A-40a to A-40c, when the kind of the lead-free low melting glass was the same, the effect of the content of the spherical glass beads B-14 including soda lime glass on bond strength improvement was the largest. A secondary effective case was the case of including the spherical glass beads B-21 including borosilicate glass.

In the case of including the spherical glass beads B-31 including the quartz glass, the effect of strength improvement was scarcely seen in the bonded bodies A-5c and A-17c and inversely the result of reducing bond strength was obtained in the bonded bodies A-33c and A-40c.

In order to find out the cause, a cross section of a bonded part of a bonded body before bond strength test was observed with an electron microscope. As a result, it was found that cracks had been generated already in the lead-free low melting glass near the interface of the spherical glass beads B-31 including quartz glass after bonding. It is considered that cracks were generated because the thermal expansion of the spherical glass beads B-31 including quartz glass was very small and the thermal expansion difference from the lead-free low melting glass was very large.

Such generation of cracks is not seen when a particle size is very small like low thermal expansion filler particles. From this, it was clarified that not only the thermal expansion of glass substrates 101 and 102 which are composite materials but also the thermal expansion difference from spherical glass beads had to be taken into consideration when spherical glass beads were mixed.

From the above, it is the most effective in improving the bond strength of a bonded body that spherical glass beads in encapsulating material paste are the same glass-based raw material as glass substrates 101 and 102. In addition to that, it was clarified that the effect of improving bond strength was obtained even with a similar glass-based raw material. This depends on the conformity of thermal expansion between glass substrates 101 and 102 and spherical glass beads. The result also suggests that it is effective to control the thermal expansion coefficient of spherical glass beads in encapsulating material paste in the range of $\pm 15 \times 10^{-7}/°$ C. of the thermal expansion coefficient of glass substrates 101 and 102. It goes without saying that the result of the present example can be effectively applied to the low temperature hermetic sealing of vacuum insulated multilayered glass.

Example 5

In the present example, on the basis of the study results in above Examples 1 to 4, a vacuum insulated multilayered glass panel according to the present invention shown in FIG. 1A was manufactured by encapsulating material paste including lead-free low melting glass in Table 1, low thermal expansion filler particles in Table 2, and spherical glass beads in Table 3 and the thermal insulation properties and reliability were evaluated. Further, as a comparative example, a vacuum insulated multilayered glass panel shown in FIG. 1 was manufactured similarly to the above by using encapsulating material paste not including spherical glass beads in Table 3 and the thermal insulation properties and reliability were evaluated. The comparative example was used for comparing with the vacuum insulated multilayered glass panel according to the present example. Here, in both the present example and the comparative example, the vacuum insulated multilayered glass panels were manufactured in accordance with the manufacturing method of a vacuum insulated multilayered glass panel shown in FIGS. 3A to 7B and the temperature profiles shown in FIGS. 8A and 8B.

In each of the vacuum insulated multilayered glass panels according to the present example and the comparative example, soda lime glass substrates of 300×300×3 mm in size were used as the first glass substrate 1 and the second glass substrate 2 and metal-made (stainless steel-made) spacers having 200 μm in height and 500 μm in outer diameter were used as the spacers 3. The encapsulating material paste used in the present example contains the lead-free low melting glass G-08 in Table 1, the low thermal expansion filler particles F-01 in Table 2, and the spherical glass beads B-13 in Table 3 as solid contents. The respective volume fractions of the solid contents are 48:27:25 (% by volume).

Further, the encapsulating material paste used in the comparative example contains the lead-free low melting glass G-08 in Table 1 and the low thermal expansion filler particles F-01 in Table 2 as solid contents. The respective volume fractions of the solid contents are 64:36 (% by volume). The content ratio of the lead-free low melting glass G-08 and the low thermal expansion filler particles F-01 in the comparative example is equivalent to the present example.

With regard to the thermal insulation properties of the manufactured vacuum insulated multilayered glass panels according to the present example and the comparative example, the heat flow rates of both the example and the comparative example were about 0.7 W/m²·K and were good.

Figure 15:
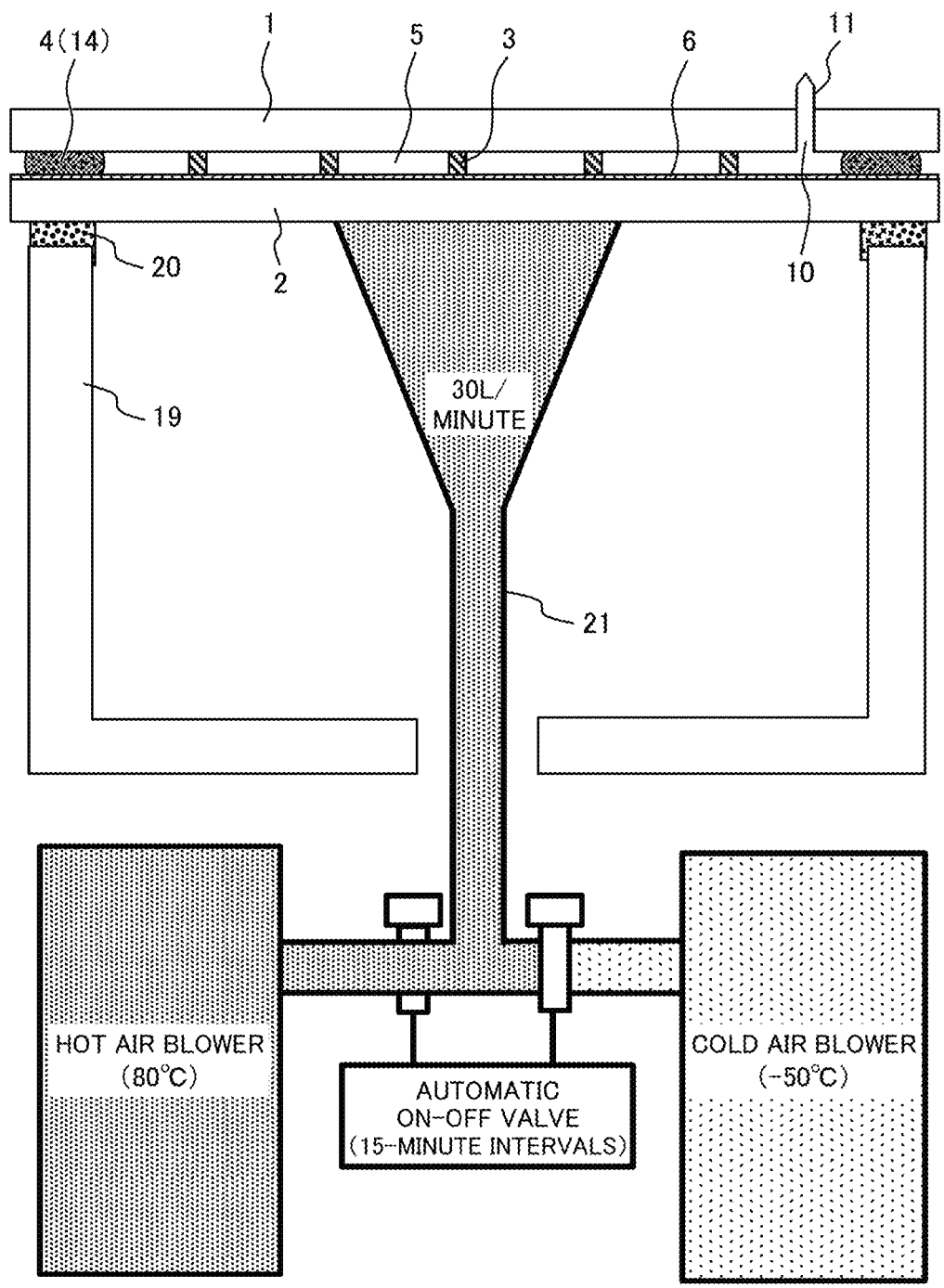
FIG. 15 is a schematic sectional view showing a reliability test apparatus for a vacuum insulated multilayered glass panel.

FIG. 15 shows a test apparatus used for evaluating reliability of a vacuum insulated multilayered glass panel.

A test apparatus shown in the present figure is configured so as to place a vacuum insulated multilayered glass panel at a square fluororesin container 19 (formed of PTFE: PolyTetraFluoroEthylene or the like) with a silicon rubber packing 20 interposed; and carry out a test. A hot air blower and a cold air blower are installed outside the fluororesin container 19. Two types of air with significantly different temperatures can be sent to the interior of the fluororesin container 19 from either of the hot air blower and the cold air blower through a fluororesin pipe 21 (formed of PTFE or the like) 10 mm in diameter. The temperature of the air can be switched by an automatic on-off valve.

Hot air of 80° C. and cold air of −50° C. were blown alternately onto the manufactured vacuum insulated multilayered glass panels according to the present example and the comparative example at a flow rate of 30 L/min for 15 minutes. One cycle was regarded as one blow of hot air and one blow of cold air, and the cycle was repeated 1,000 times. Then a damaged state of a seal part was evaluated by measuring a heat flow rate and the like after repeating 1,000 times.

After the above cycles have elapsed, in the vacuum insulated multilayered glass panel according to the comparative example, the seal part did not appear to be damaged in appearance, but leakage occurred somewhere, and no thermal insulation was obtained at all. On the other hand, in the vacuum insulated multilayered glass panel according to the present example, it was confirmed that the primary thermal insulation properties were maintained and the seal part was not damaged. From this, it was clarified that the mixing of spherical glass beads into a seal part was effective.

Example 6

In the present example, in the solid content in Example 5, the lead-free low melting glass G-12 in Table 1 was used instead of the lead-free low melting glass G-08 in Table 1. The other constituent components in the solid content are the low thermal expansion filler particles F-01 in Table 2 and the spherical glass beads B-13 in Table 3. A vacuum insulated multilayered glass panel according to the present invention shown in FIG. 1A was manufactured by using encapsulating material paste including the solid content and the thermal insulation properties and reliability of the panel were evaluated. Further, as a comparative example, a vacuum insulated multilayered glass panel shown in FIG. 1A was manufactured by using encapsulating material paste excluding the spherical glass beads in Table 3 from the solid content of the present example and the thermal insulation properties and reliability of the panel were evaluated. The comparative example was used for comparison with the vacuum insulated multilayered glass panel according to the present example.

In addition, the different point of the vacuum insulated multilayered glass panels according to the present example and the comparative example from Example 5 is that polyimide resin-made spacers having 200 μm in height and 500 μm in outer diameter were used as the spacers 3 of the present example. As spacers 3 in the comparative example, metal-made (stainless steel-made) spacers of the same shape were used similarly to Example 5.

The volume fractions of the lead-free low melting glass G-12, the low thermal expansion filler particles F-01, and the spherical glass beads B-13 in the solid content in the encapsulating material paste used in the present example are 46:29:25 (% by volume). Further, in the encapsulating material paste used in the comparative example, the volume fractions of the lead-free low melting glass G-12 and the low thermal expansion filler particles F-01 in the solid content are 61:39 (% by volume). The content ratio of the lead-free low melting glass G-12 and the low thermal expansion filler particles F-01 in the comparative example is equivalent to the present example.

With regard to the thermal insulation properties of the manufactured vacuum insulated multilayered glass panels according to the present example and the comparative example, whereas the heat flow rate of the comparative example was about 0.7 W/m$^2$·K, the heat flow rate of the present example was about 0.5 W/m$^2$·K. That is, the vacuum insulated multilayered glass panel according to the present example showed better thermal insulation properties than the vacuum insulated multilayered glass panel according to the comparative example. This is because resin with significantly lower thermal conductivity than metal was used as the spacers 3.

The reliability of the manufactured vacuum insulated multilayered glass panels according to the present example and the comparative example was evaluated similarly to Example 5.

After the cycles similar to Example 5 elapsed, in the vacuum insulated multilayered glass panel according to the comparative example, the seal part did not appear to be damaged in appearance, but leakage occurred, and the thermal insulation properties deteriorated significantly. On the other hand, in the vacuum insulated multilayered glass panel according to the present example, it was confirmed that the primary thermal insulation properties were maintained and the seal part was not damaged. From this, it was clarified that the mixing of spherical glass beads into a seal part was effective. Further, the effectiveness of the resin-made spacers was recognized.

Example 7

In the present example, in the solid content of Example 5, the lead-free low melting glass G-24 in Table 1 and the spherical glass beads B-12 in Table 3 were used instead of the lead-free low melting glass G-08 in Table 1 and the spherical glass beads B-13 in Table 3. The other constituent component in the solid content is the low thermal expansion filler particles F-01 in Table 2. A vacuum insulated multilayered glass panel according to the present invention shown in FIG. 1A was manufactured by using encapsulating material paste including the solid content and the thermal insulation properties and reliability of the panel were evaluated. Further, as a comparative example, a vacuum insulated multilayered glass panel shown in FIG. 1A was manufactured by using encapsulating material paste excluding the spherical glass beads in Table 3 from the solid content of the present example and the thermal insulation properties and reliability of the panel were evaluated. The comparative example was used for comparison with the vacuum insulated multilayered glass panel according to the present example.

In addition, the different points of the vacuum insulated multilayered glass panels according to the present example and the comparative example from Example 5 are that air-cool tempered soda lime glass substrates were used as the first glass substrate 1 and the second glass substrate 2 and that polyamide resin-made spacers having 150 μm in height and 300 μm in outer diameter were used as the spacers 3 of the present example. As spacers 3 in the comparative example, metal-made (stainless steel-made) spacers of the same shape as the present example were used.

The volume fractions of the lead-free low melting glass G-24, the low thermal expansion filler particles F-01, and the spherical glass beads B-12 in the solid content in the encapsulating material paste used in the present example are 46:34:20 (% by volume). Further, in the encapsulating material paste used in the comparative example, the volume fractions of the lead-free low melting glass G-24 and the low thermal expansion filler particles F-01 in the solid content are 57:43 (% by volume). The content ratio of the lead-free low melting glass G-24 and the low thermal expansion filler particles F-01 in the comparative example is equivalent to the present example.

With regard to the thermal insulation properties of the manufactured vacuum insulated multilayered glass panels according to the present example and the comparative example, whereas the heat flow rate of the comparative example was about 0.8 W/m$^2$·K, the heat flow rate of the present example was about 0.6 W/m$^2$·K. That is, the vacuum insulated multilayered glass panel according to the present example showed better thermal insulation properties than the vacuum insulated multilayered glass panel according to the comparative example. This is because resin with significantly lower thermal conductivity than metal is used as the spacers 3.

The reliability of the manufactured vacuum insulated multilayered glass panels according to the present example and the comparative example was evaluated similarly to Example 5.

After the cycles similar to Example 5 elapsed, in the vacuum insulated multilayered glass panel according to the comparative example, an exfoliated part was recognized in the seal part in appearance and the thermal insulation properties deteriorated significantly. On the other hand, in the vacuum insulated multilayered glass panel according to the present example, it was confirmed that the primary thermal insulation properties were maintained and the seal part was not damaged. From this, it was clarified that the mixing of spherical glass beads into a seal part was effective. Further, the effectiveness of the resin-made spacers was recognized. Furthermore, it was clarified that air-cool tempered glass could be applied effectively to a glass substrate.

Example 8

In the present example, in the solid content of Example 5, the lead-free low melting glass G-25 in Table 1 and the spherical glass beads B-15 in Table 3 were used instead of the lead-free low melting glass G-08 in Table 1 and the spherical glass beads B-13 in Table 3. The other constituent component in the solid content is the low thermal expansion filler particles F-01 in Table 2. A vacuum insulated multilayered glass panel according to the present invention shown in FIG. 1A was manufactured by using encapsulating material paste including the solid content and the thermal insulation properties and reliability of the panel were evaluated. Further, as a comparative example, a vacuum insulated multilayered glass panel shown in FIG. 1A was manufactured by using encapsulating material paste excluding the spherical glass beads in Table 3 from the solid content of the present example and the thermal insulation properties and reliability of the panel were evaluated. The comparative example was used for comparison with the vacuum insulated multilayered glass panel according to the present example.

In addition, the different points of the vacuum insulated multilayered glass panels according to the present example and the comparative example from Example 5 are that a chemically tempered soda lime glass substrate was used as the first glass substrate 1 and the second glass substrate 2 and that fluororesin spacers including ceramic particles having 250 μm in height and 500 μm in outer diameter were used as the spacers 3 of the present example. Here, the ceramic particles are $Al_2O_3$ particles. The ceramic particles are dispersed in resin spacers so that the resin spacers might not deform during hermetic sealing. As spacers 3 in the comparative example, metal-made (stainless steel-made) spacers of the same shape as the present example were used.

The volume fractions of the lead-free low melting glass G-25, the low thermal expansion filler particles F-01, and the spherical glass beads B-15 in the solid content in the encapsulating material paste used in the present example are 40:30:30 (% by volume). Further, in the encapsulating material paste used in the comparative example, the volume fractions of the lead-free low melting glass G-25 and the low thermal expansion filler particles F-01 in the solid content are 57:43 (% by volume). The content ratio of the lead-free low melting glass G-25 and the low thermal expansion filler particles F-01 in the comparative example is equivalent to the present example.

With regard to the thermal insulation properties of the manufactured vacuum insulated multilayered glass panels according to the present example and the comparative example, whereas the heat flow rate of the comparative example was about 0.7 $W/m^2 \cdot K$, the heat flow rate of the present example was about 0.4 $W/m^2 \cdot K$. That is, the vacuum insulated multilayered glass panel according to the present example showed better thermal insulation properties than the vacuum insulated multilayered glass panel according to the comparative example. This is because resin with significantly lower thermal conductivity than metal was used as the spacers 3.

In the vacuum insulated multilayered glass panel according to the comparative example, some exfoliated parts were recognized in the seal part in appearance and the thermal insulation properties deteriorated significantly. On the other hand, in the vacuum insulated multilayered glass panel according to the present example, it was confirmed that the primary thermal insulation properties were maintained and the seal part was not damaged. From this, it was clarified that the mixing of spherical glass beads into a seal part was effective. Further, the effectiveness of resin spacers in which ceramic particles were dispersed was confirmed. Furthermore, it was clarified that chemically tempered glass could be applied effectively to a glass substrate.

Example 9

In the present example, in the solid content of Example 5, the lead-free low melting glass G-22 in Table 1 was used instead of the lead-free low melting glass G-08 in Table 1. The other constituent components in the solid content are the low thermal expansion filler particles F-01 in Table 2 and the spherical glass beads B-13 in Table 3. Two types of vacuum insulated multilayered glass panels according to the present invention shown in FIG. 1A were manufactured by using encapsulating material paste including the solid content while the material of the spacers 3 is changed and the thermal insulation properties and reliability of the panels were evaluated. Further, as a comparative example, a vacuum insulated multilayered glass panel shown in FIG. 1A was manufactured by using encapsulating material paste excluding the spherical glass beads in Table 3 from the solid content of Example 5 and the thermal insulation properties and reliability of the panel were evaluated. The comparative example was used for comparison with the vacuum insulated multilayered glass panels according to the present example.

In addition, the different point of the vacuum insulated multilayered glass panels according to the present example and the comparative example from Example 5 is that two types of spacers including epoxy resin including glass particles and phenoxy resin including glass particles, having 200 μm in height and 500 μm in outer diameter, were used as the spacers 3 of the present example. Here, the glass particles are $SiO_2$ particles. The glass particles were dispersed in resin spacers so that the resin spacers might not deform during hermetic sealing. As spacers 3 in the comparative example, metal-made (stainless steel-made) spacers of the same shape as the present example were used.

The volume fractions of the lead-free low melting glass G-22, the low thermal expansion filler particles F-01, and the spherical glass beads B-13 in the solid content in the encapsulating material paste used in the present example are 42:38:20 (% by volume). Further, in the encapsulating material paste used in the comparative example, the volume fractions of the lead-free low melting glass G-22 and the low thermal expansion filler particles F-01 in the solid content are 53:47 (% by volume). The content ratio of the lead-free low melting glass G-22 and the low thermal expansion filler particles F-01 in the comparative example is equivalent to the present example.

With regard to the thermal insulation properties of the manufactured vacuum insulated multilayered glass panels according to the present example and the comparative example, whereas the heat flow rate of the comparative example was about 0.8 $W/m^2 \cdot K$, the heat flow rate of the present example was about 0.5 $W/m^2 \cdot K$ in both the two types. That is, the vacuum insulated multilayered glass panels according to the present example showed better thermal insulation properties than the vacuum insulated multilayered glass panel according to the comparative example. This is because resin with significantly lower thermal conductivity than metal was used as the spacers 3.

In the vacuum insulated multilayered glass panel according to the comparative example, some exfoliated parts were recognized in the seal part in appearance and the thermal insulation properties deteriorated significantly. On the other hand, in the vacuum insulated multilayered glass panels according to the present example, it was confirmed that the primary thermal insulation properties were maintained and the seal part was not damaged. From this, it was clarified that the mixing of spherical glass beads into a seal part was effective. Further, the effectiveness of resin spacers in which glass particles were dispersed was confirmed.

Example 10

In the present example, in the solid content of Example 5, the lead-free low melting glass G-42 in Table 1 was used instead of the lead-free low melting glass G-08 in Table 1. The other constituent components in the solid content are the low thermal expansion filler particles F-01 in Table 2 and the spherical glass beads B-13 in Table 3. A vacuum insulated multilayered glass panel according to the present invention shown in FIG. 1A was manufactured by using encapsulating material paste including the solid content and the thermal insulation properties and reliability of the panel were evaluated. Further, as a comparative example, a vacuum insulated multilayered glass panel shown in FIG. 1A was manufactured by using encapsulating material paste excluding the spherical glass beads in Table 3 from the solid content of the present example and the thermal insulation properties and reliability of the panel were evaluated. The comparative example was used for comparison with the vacuum insulated multilayered glass panel according to the present example.

In addition, the different points of the vacuum insulated multilayered glass panels according to the present example and the comparative example from Example 5 are that air-cool tempered soda lime glass substrates were used as the first glass substrate 1 and the second glass substrate 2 and that silicon resin spacers including glass particles having 200 μm in height and 500 μm in outer diameter were used as the spacers 3 of the present example. Here, the glass particles are $SiO_2$ particles. The glass particles were dispersed in resin spacers so that the resin spacers might not deform during hermetic sealing. As spacers 3 in the comparative example, metal-made (stainless steel-made) spacers of the same shape as the present example were used.

The volume fractions of the lead-free low melting glass G-42, the low thermal expansion filler particles F-01, and the spherical glass beads B-13 in the solid content in the encapsulating material paste used in the present example are 43:32:25 (% by volume). Further, in the encapsulating material paste used in the comparative example, the volume fractions of the lead-free low melting glass G-42 and the low thermal expansion filler particles F-01 in the solid content are 57:43 (% by volume). The content ratio of the lead-free low melting glass G-42 and the low thermal expansion filler particles F-01 in the comparative example is equivalent to the present example.

With regard to the thermal insulation properties of the manufactured vacuum insulated multilayered glass panels according to the present example and the comparative example, whereas the heat flow rate of the comparative example was about 0.7 $W/m^2 \cdot K$, the heat flow rate of the present example was about 0.4 $W/m^2 \cdot K$. That is, the vacuum insulated multilayered glass panel according to the present example showed better thermal insulation properties than the vacuum insulated multilayered glass panel according to the comparative example. This is because resin with significantly lower thermal conductivity than metal was used as the spacers 3.

In the vacuum insulated multilayered glass panel according to the comparative example, an exfoliated part was recognized in the seal part in appearance and the thermal insulation properties deteriorated significantly. On the other hand, in the vacuum insulated multilayered glass panel according to the present example, it was confirmed that the primary thermal insulation properties were maintained and the seal part was not damaged. From this, it was clarified that the mixing of spherical glass beads into a seal part was effective. Further, the effectiveness of resin spacers in which glass particles were dispersed was confirmed. Furthermore, it was clarified that air-cool tempered glass was applied effectively to a glass substrate.

From Example 1 to Example 10 described above, a vacuum insulated multilayered glass panel according to the present invention can achieve hermetic sealing at a low temperature and hence is excellent also in mass productivity. Moreover, resin of low thermal conductivity can be used for spaces and hence the thermal insulation properties are also excellent. Further, the bond strength of a seal part can be improved and hence reliability is also excellent. The mass productivity, thermal insulation properties, and reliability can be realized by encapsulating material paste according to the present invention.

In this way, a vacuum insulated multilayered glass panel according to the present invention to which encapsulating material paste according to the present invention is applied can be spread widely in housing and construction fields around the world, reduces $CO_2$ emissions by reducing energy consumption, and can contribute largely to global warming countermeasures.

REFERENCE SIGNS LIST

1 . . . first glass substrate,
2 . . . second glass substrate,
3 . . . spacer,
4 . . . seal part,
5 . . . interior space,
6 . . . heat ray reflecting film,
7 . . . low melting glass,
8 . . . low thermal expansion filler particles,
9 . . . glass beads,
10 . . . exhaust hole,
11 . . . exhaust pipe,
12 . . . dispenser,
13 . . . encapsulating material paste,
14 . . . encapsulating material,
15 . . . heat resistant clip,
16 . . . vacuum exhaust furnace,
17 . . . electric heater,
18 . . . vacuum pump,
19 . . . fluororesin container,
20 . . . silicon rubber packing,
21 . . . fluororesin pipe,
51 . . . shear jig,
52 . . . bonded body fixing jig,
101, 102 . . . glass substrate

The invention claimed is:
1. A sealing material for a seal part comprising:
lead-free low melting glass particles containing vanadium oxide and tellurium oxide;
low thermal expansion filler particles; and
glass beads as a solid content,
wherein a volume fraction of the glass beads in the solid content is not less than 10% to not more than 35%; and a volume fraction of the lead-free low melting glass particles in the solid content is larger than a volume fraction of the low thermal expansion filler particles in the solid content, and the sealing material for the seal part is interposed between a first glass substrate and a second glass substrate of a multilayered glass panel;

wherein an average diameter ($D_{50}$) of the glass beads is not less than 50 μm to not more than 200 μm;

wherein an average particle size of the low thermal expansion filler particle is not less than 3 μm to not more than 20 μm; and wherein the glass beads are formed of borosilicate glass or quartz glass.

2. The sealing material according to claim 1, wherein a volume fraction of the glass beads in the solid content is not less than 20% to not more than 30%.

3. The sealing material according to claim 1, wherein a volume fraction of the lead-free low melting glass particles in the solid content is not less than 35%.

4. The sealing material according to claim 1, wherein the lead-free low melting glass particles further contain silver oxide.

5. The sealing material according to claim 1, wherein the lead-free low melting glass particles further contain at least one kind of tungsten oxide, barium oxide, potassium oxide, and phosphorus oxide.

6. The sealing material according to claim 1, wherein the lead-free low melting glass particles further contain at least one kind of aluminum oxide, iron oxide, yttrium oxide, and lanthanum oxide.

7. The sealing material according to claim 1, wherein the low thermal expansion filler particles include zirconium phosphate tungstate.

8. The sealing material according to claim 1, further comprising a solvent and a binder resin.

9. The sealing material according to claim 8, wherein the binder resin contains at least one kind of ethyl cellulose, nitrocellulose, and aliphatic polycarbonate.

10. The sealing material according to claim 8, wherein the solvent contains at least one kind of butyl carbitol acetate, a terpene solvent, and propylene carbonate.

11. A multilayered glass panel comprising:

a first glass substrate;

a second glass substrate placed so as to face the first glass substrate at a predetermined distance;

spacers interposed between the first glass substrate and the second glass substrate and keeping the distance; and a seal part interposed between the first glass substrate and the second glass substrate, having an interior space surrounded by the first glass substrate, the second glass substrate, and the seal part, wherein the spacers are placed in the interior space; and the seal part contains the sealing material according to claim 1, and the sealing material for the seal part is disposed on the seal part.

12. The multilayered glass panel according to claim 11, wherein a maximum diameter of the glass beads is not larger than the distance; and an average diameter ($D_{50}$) of the glass beads is not smaller than half of the distance.

13. The multilayered glass panel according to claim 11, wherein a thermal expansion coefficient of the glass beads is in a range of $\pm 15 \times 10^{-7}/°$ C. of a thermal expansion coefficient of the first glass substrate or the second glass substrate.

14. The multilayered glass panel according to claim 11, wherein the spacers contain a resin.

15. The multilayered glass panel according to claim 14, wherein the resin contains at least one kind of polyimide resin, polyamide resin, fluororesin, epoxy resin, phenoxy resin, and silicone resin.

16. The multilayered glass panel according to claim 14, wherein the spacers contain glass particles or ceramic particles.

17. The multilayered glass panel according to claim 11, wherein the first glass substrate or the second glass substrate includes tempered glass subjected to an air-cool tempering treatment or a chemical tempering treatment.

* * * * *